US008726461B2

(12) United States Patent
Makarov et al.

(10) Patent No.: US 8,726,461 B2
(45) Date of Patent: May 20, 2014

(54) DUAL STAGE CYCLONIC VACUUM CLEANER

(75) Inventors: Sergey V. Makarov, Solon, OH (US); Robert A. Salo, Mentor, OH (US); Mark E. Cipolla, Chardon, OH (US); Steven W. Kegg, Uniontown, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 954 days.

(21) Appl. No.: 12/125,505

(22) Filed: May 22, 2008

(65) Prior Publication Data

US 2008/0289139 A1    Nov. 27, 2008

Related U.S. Application Data

(60) Provisional application No. 60/931,532, filed on May 24, 2007.

(51) Int. Cl.
*A47L 9/10* (2006.01)

(52) U.S. Cl.
USPC .................................. 15/353; 15/352; 15/345

(58) Field of Classification Search
USPC .................... 15/350, 352, 353, 347, 319, 345; 55/DIG. 3, 459.1
See application file for complete search history.

(56) References Cited

U.S. PATENT DOCUMENTS

| | | | |
|---|---|---|---|
| 6,859,975 B2 * | 3/2005 | Ohta et al. | 15/347 |
| 7,410,516 B2 * | 8/2008 | Ivarsson et al. | 55/337 |
| 2005/0252180 A1 * | 11/2005 | Oh et al. | 55/345 |
| 2006/0137310 A1 | 6/2006 | Conrad et al. | |
| 2006/0185113 A1 | 8/2006 | Kloeppel et al. | |
| 2008/0289140 A1 * | 11/2008 | Courtney et al. | 15/353 |

FOREIGN PATENT DOCUMENTS

| | | |
|---|---|---|
| EP | 1779761 A2 | 5/2007 |
| WO | WO 99/65619 A2 | 12/1999 |

OTHER PUBLICATIONS

International Search Report and Written Opinion for International Application No. PCT/US 08/64495; Authorized Officer Lee W. Young; Mailing Date: Aug. 18, 2008; 8 pages.
Office Action from the United Kingdom Intellectual Property Office for Application No. 1209839.8 dated Jun. 20, 2012 (5 pages).
First Office Action from the State Intellectual Property Office of China for Application No. 200880020475.X dated Nov. 4, 2011 (Original and English Translation—31 pages).

* cited by examiner

*Primary Examiner* — Robert Scruggs
(74) *Attorney, Agent, or Firm* — Michael Best & Friedrich LLP

(57) ABSTRACT

A home cleaning appliance comprises a housing, an airstream suction source, a cyclone main body, and a dirt cup. The housing includes a main suction opening. The airstream suction source is mounted to the housing and includes a suction airstream inlet and a suction airstream outlet. The suction source selectively establishes and maintains a flow of air from the main suction opening, via the airstream inlet, to the airstream outlet. The cyclone main body is supported by the housing and is in communication with the main suction opening. The cyclone main body has a uniform outer circumference and includes a first stage separator, and a plurality of downstream second stage separators. The first stage separator has a longitudinal axis offset from a longitudinal axis of the cyclone main body in order to accommodate the second stage separators. The dirt cup is connected to the cyclone main body. The dirt cup includes a first particle collector and a second particle collector. The first particle collector communicates with the first stage separator for collecting dust particles from the first stage separator. The separate second particle collector communicates with the plurality of second stage separators for collecting dust particles from the second stage separators.

19 Claims, 16 Drawing Sheets

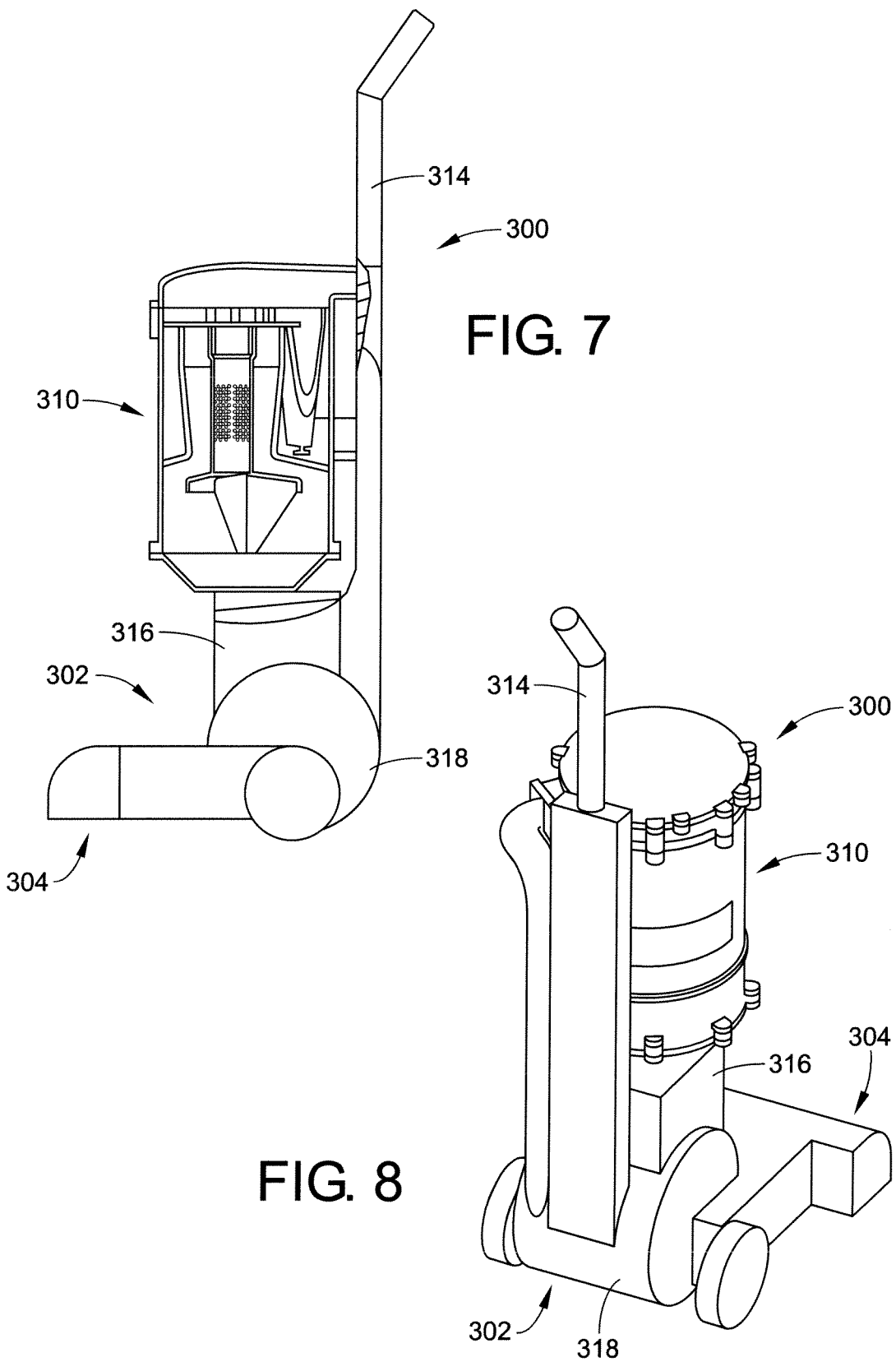

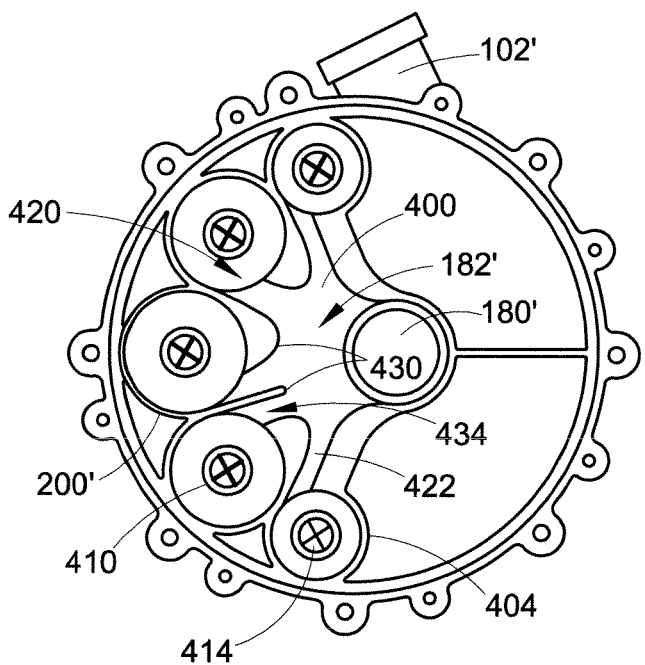
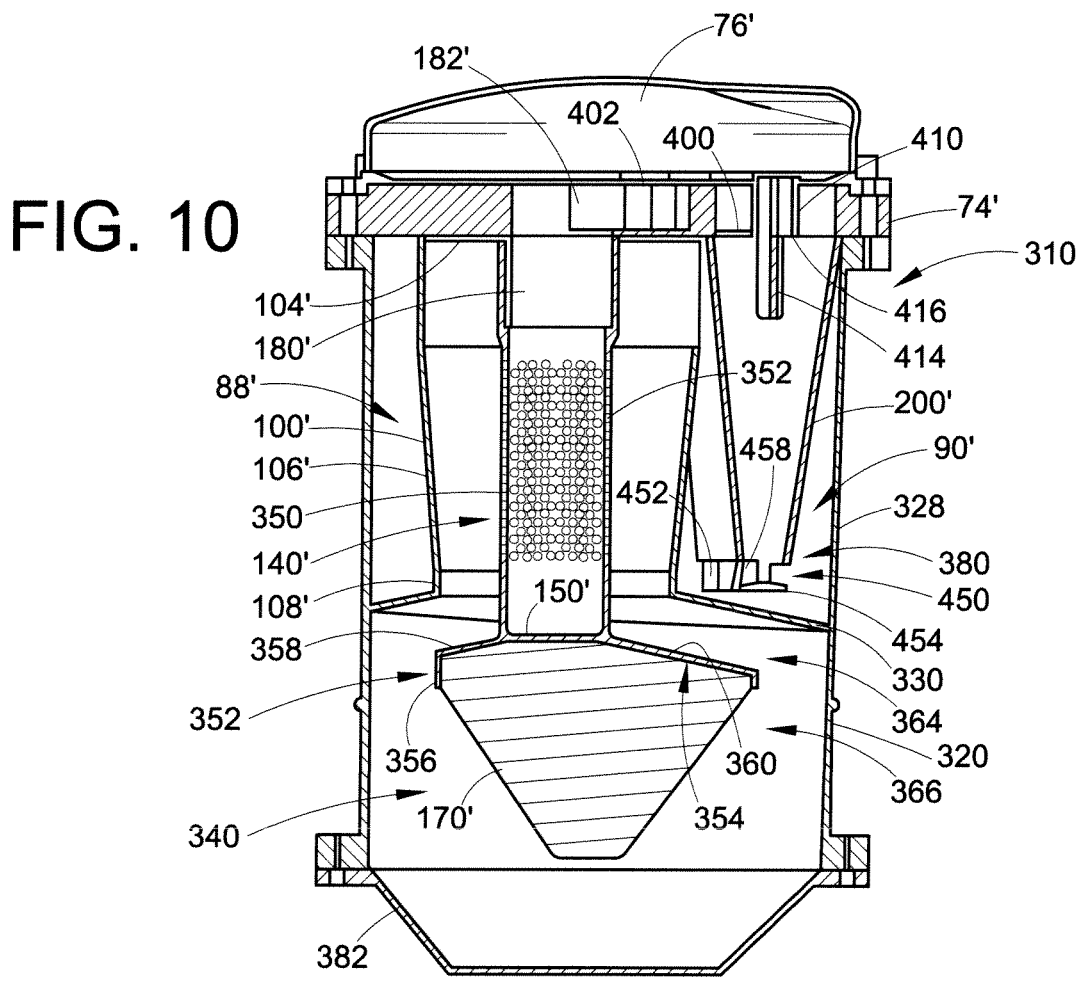

DUAL STAGE CYCLONIC VACUUM CLEANER

CROSS REFERENCE TO RELATED APPLICATIONS

This application claims priority from U.S. Provisional Patent Application Ser. No. 60/931,532 filed May 24, 2007, which provisional patent application is expressly incorporated herein by reference, in its entirety.

BACKGROUND

The present disclosure relates to vacuum cleaners. More particularly, the present disclosure relates to dual stage cyclonic vacuum cleaners used for suctioning dirt and debris from carpets and floors. Such vacuum cleaners can be upright, canister, hand-held or stationary, built into a house. Moreover, cyclonic designs have also been used on carpet extractors and "shop" type vacuum cleaners.

Upright vacuum cleaners are well known in the art. The two major types of traditional vacuum cleaners are a soft bag vacuum cleaner and a hard shell vacuum cleaner. In the hard shell vacuum cleaner, a vacuum source generates the suction required to pull dirt from the carpet or floor being vacuumed through a suction opening and into a filter bag or a dust cup housed within the hard shell upper portion of the vacuum cleaner. After multiple uses of the vacuum cleaner, the filter bag must be replaced or the dust cup emptied.

To avoid the need for vacuum filter bags, and the associated expense and inconvenience of replacing the filter bag, another type of upright vacuum cleaner utilizes cyclonic air flow and perhaps one or more filters, rather than a replaceable filter bag, to separate the dirt and other particulates from the suction air stream. If filters are used, they would need infrequent replacement.

The cyclonic air flow can be generated from a single stage cyclonic separator or a multi-stage cyclonic separator. One of the most common challenges regarding the design of a multi-stage cyclonic separator unit is the dust collector, which needs to be compact and easily serviceable by the user. The dust collector generally includes a first cyclonic separator, a plurality of second cyclonic separators and at least one particle collector. The position of the second cyclonic separators poses additional design concerns. For example, the second cyclones can be positioned above the first cyclone. But, this can increase the overall height of the dust collector, which is especially disadvantageous for canister vacuum cleaners. Alternatively, the second cyclones can be positioned around the first cyclone to form a separate, second particle collector. However, this can increase the overall width of the particle collector, which is especially disadvantageous for upright vacuum cleaners. Also, with such a design, the diameter of the first particle collector remains relatively small, which is disadvantageous from the standpoint of separation efficiency. As another alternative, the second cyclones can be positioned inside and at least partially below a top wall of the first cyclone. However with such a design, the second cyclones are hidden and difficult to service due to lack of access.

Therefore, while some prior art cyclonic air flow vacuum cleaner designs and constructions are acceptable, the need exists for continued improvements and alternative designs for such vacuum cleaners. For example, it would be desirable to simplify assembly, improve filtering and dirt removal, and allow easier maintenance of such cleaners.

Accordingly, the present disclosure provides an improved dual stage cyclonic air flow design which overcomes certain difficulties with the prior art designs while providing better and more advantageous overall results.

BRIEF DESCRIPTION

In accordance with one aspect of the present disclosure, a home cleaning appliance comprises a housing, an airstream suction source, a cyclone main body, and a dirt cup. The housing includes a main suction opening. The airstream suction source is mounted to the housing and includes a suction airstream inlet and a suction airstream outlet. The suction source selectively establishes and maintains a flow of air from the main suction opening, via the airstream inlet, to the airstream outlet. The cyclone main body is supported by the housing and is in communication with the main suction opening. The cyclone main body has a uniform outer circumference and includes a first stage separator, and a plurality of downstream second stage separators. The first stage separator has a longitudinal axis offset from a longitudinal axis of the cyclone main body in order to accommodate the second stage separators. The dirt cup is connected to the cyclone main body. The dirt cup includes a first particle collector and a second particle collector. The first particle collector communicates with the first stage separator for collecting dust particles from the first stage separator. The separate second particle collector communicates with the plurality of second stage separators for collecting dust particles from the second stage separators.

In accordance with another aspect of the present disclosure, a home cleaning appliance comprises a housing, an airstream suction source, a cyclone main body, and a dirt cup for collecting separated dust particles. The cyclone main body includes a first stage separator and a plurality of second stage separators. A diameter of an upper end of one of the second stage separators is larger than a diameter of an upper end of another one of the second stage separators.

In accordance with yet another aspect of the present disclosure, a home cleaning appliance comprises a housing, an airstream suction source, a cyclone main body, and a dirt cup for collecting separated dust particles. The cyclone main body defines a longitudinal axis. The cyclone main body includes a first cyclonic separation stage and a second cyclonic separation stage. The first cyclonic separation stage has a longitudinal axis offset from the longitudinal axis of the cyclone main body. The second cyclonic separation stage is spaced from the first cyclonic separation stage. The dirt cup defines a longitudinal axis which is offset from the longitudinal axis of the first cyclonic separation stage. A perforated tube is disposed within the first cyclonic separation stage for fluidly connecting the first cyclonic separation stage to the second cyclonic separation stage. The perforated tube defines a longitudinal axis which is coincident with the longitudinal axis of the first cyclonic separation stage. A laminar flow member is connected to the perforated tube. The laminar flow member is centrally positioned within the dirt cup.

In accordance with yet another aspect of the present disclosure, a home cleaning appliance comprises a housing, an airstream suction source, a cyclone main body, and a dirt cup for collecting separated dust particles. The cyclone main body includes an upstream, first, cyclonic separator for separating dust from dust-laden air and at least one downstream, second, cyclonic separator for separating remaining dust particles from the air. The first separator is generally frusto-conical in shape and includes a dirty air inlet, a top wall and a sidewall. The dirt cup includes a first particle collector and a second particle collector. The first particle collector is located beneath the first separator and communicates with the first stage separator for collecting dust particles from the first stage separator. The first particle collector includes a sidewall. The separate second particle collector communicates with the at least one second separator for collecting dust particles from the at least one second separator. A section of the first separator sidewall and a section of the first particle collector sidewall together at least partially define the second particle collector. The second particle collector has a non-constant radius.

Still other aspects of the disclosure will become apparent from a reading and understanding of the detailed description of the several embodiments described hereinbelow.

BRIEF DESCRIPTION OF THE DRAWINGS

The present disclosure may take physical form in certain parts and arrangements of parts, several embodiments of which will be described in detail in this specification and illustrated in the accompanying drawings which form a part of the disclosure.

FIG. 7 is a side elevational view of an upright vacuum cleaner in partial cross-section, in accordance with a second aspect of the present disclosure.

FIG. 8 is a rear perspective view of the upright vacuum cleaner of FIG. 7.

FIG. 10 is a cross-sectional view of the dust collector of FIG. 9 taken generally along the line 10-10 of FIG. 9.

FIG. 12 is a cross-sectional view of the dust collector of FIG. 9 taken generally along the line 12-12 of FIG. 9.

DETAILED DESCRIPTION

It should, of course, be understood that the description and drawings herein are merely illustrative and that various modifications and changes can be made in the structures disclosed without departing from the instant disclosure. Like numerals refer to like parts throughout the several views. It will also be appreciated that the various identified components of the cyclonic vacuum cleaner disclosed herein are merely terms of art that may vary from one manufacturer to another and should not be deemed to limit the present disclosure.

Figure 1:
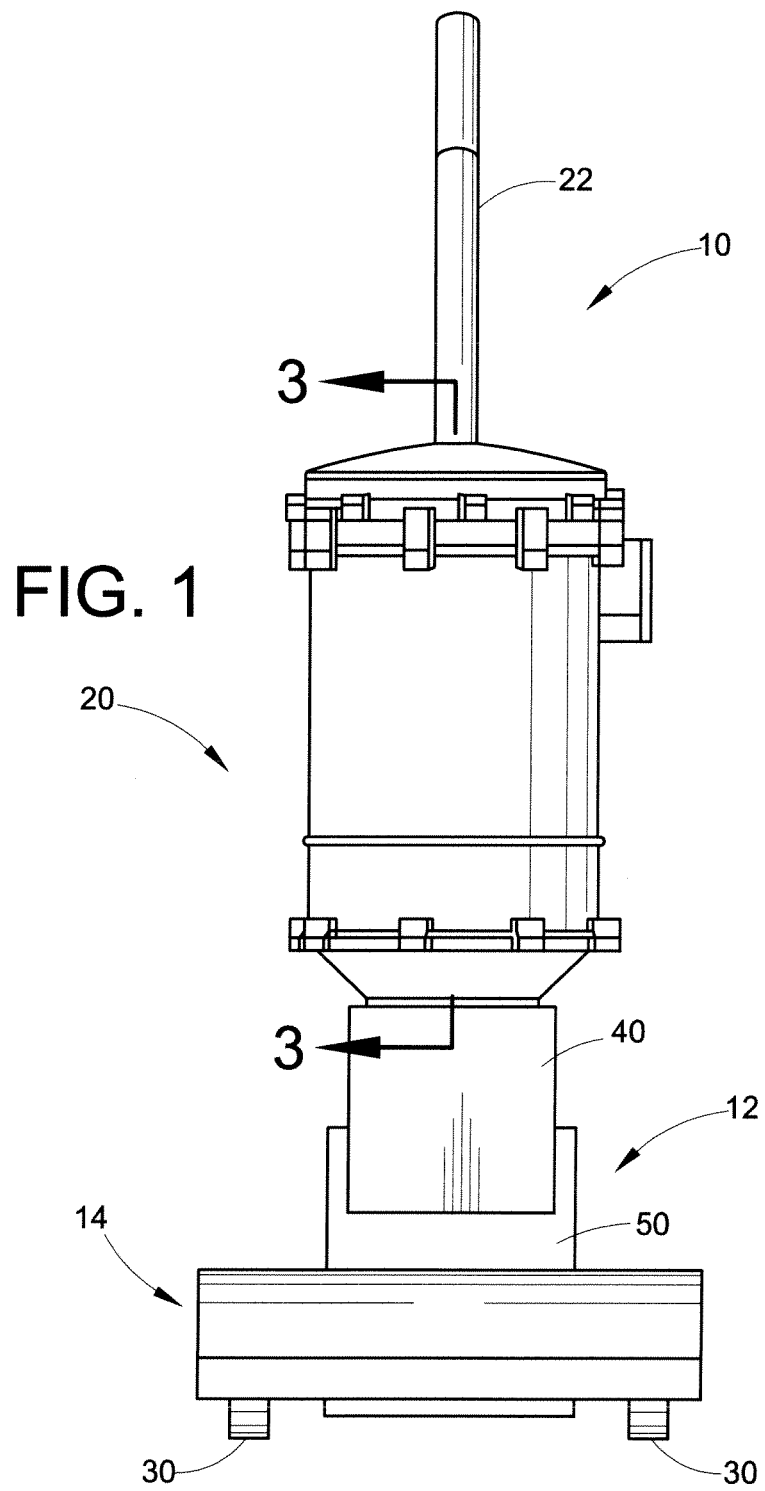
FIG. 1 is a front elevational view of an upright vacuum cleaner including a dual stage cyclonic dust collector in accordance with one aspect of the present disclosure.
Figure 2:
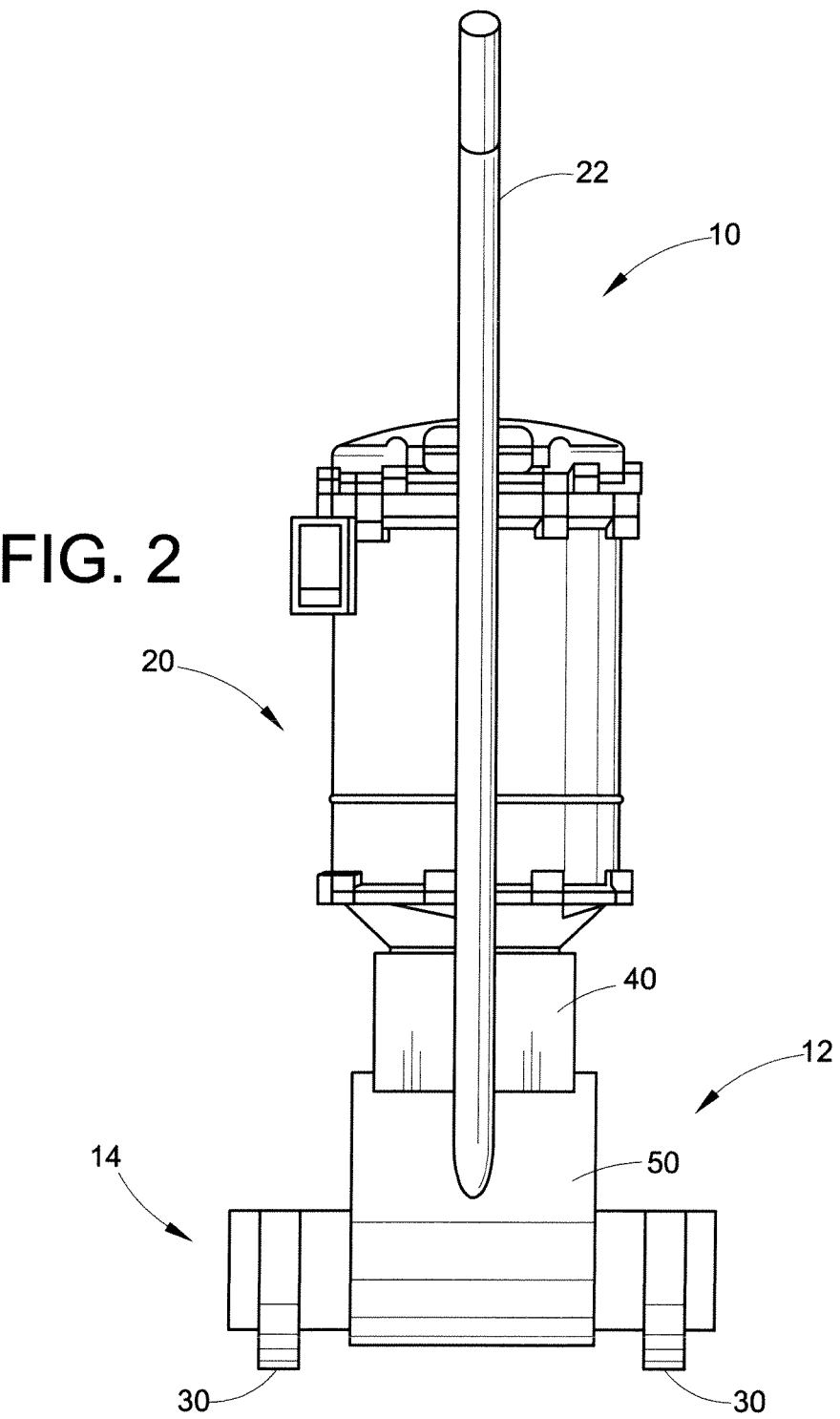
FIG. 2 is a rear elevational view of the upright vacuum cleaner of FIG. 1.
Figure 3:
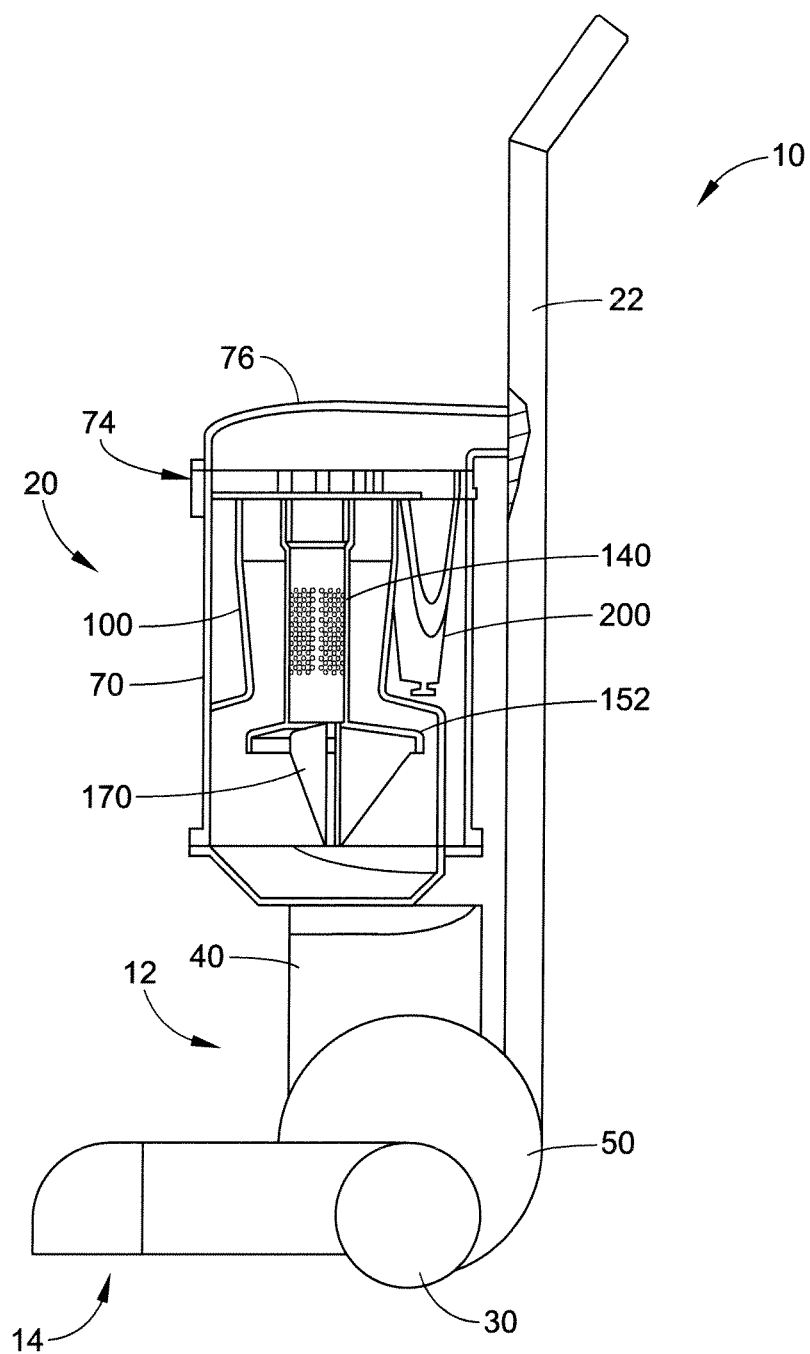
FIG. 3 is a side elevational view of the upright vacuum cleaner of FIG. 1 in partial cross-section, 1 taken generally along the line 3-3 of FIG. 1.

Referring now to the drawings, wherein the drawings illustrate several embodiments of the present disclosure only and are not intended to limit same, FIGS. 1-3 illustrate an upright dual stage vacuum cleaner 10, generally including an upper housing assembly 12, a nozzle base 14, and a dust collector 20 supported by the housing assembly according to one aspect of the present disclosure. The upper housing assembly 12 and the nozzle base 14 are pivotally or hingedly connected through the use of trunnions or another suitable hinge assembly, so that the dust collector 20 pivots between a generally vertical storage position (as shown) and an inclined use position. The nozzle base 14 can be made from conventional materials, such as molded plastics and the like. A handle 22 extends upward from the upper housing 12, by which an operator of the dual stage cyclone vacuum cleaner 10 is able to grasp and maneuver the vacuum cleaner.

During vacuuming operations, the nozzle base 14 travels across a floor, carpet, or other subjacent surface being cleaned. An underside of the nozzle base includes a main suction opening (not shown) formed therein, which can extend substantially across the width of the nozzle at the front end thereof. As is known, the main suction opening is in fluid communication with the dust collector 20 through a dirty air conduit (not shown).

As is conventional, a rotating brush assembly (not shown) is positioned in the region of the nozzle main suction opening for contacting and scrubbing the surface being vacuumed to loosen embedded dirt and dust. A plurality of wheels 30 supports the nozzle base 14 on the surface being cleaned and facilitates its movement thereacross. A base member 40 can be mounted to the upper housing assembly 12 for releasably supporting the dust collector 20. A latch assembly (not shown) can be mounted to the base member for securing the dust collector thereto.

An airstream suction source, such as an electric motor and fan assembly, is supported by the housing. In the depicted embodiment, the electric motor and fan assembly can be housed in a motor housing 50 which comprises a lower portion of the upper housing 12. The motor and fan assembly generates the required suction airflow for cleaning operations by creating a suction force in a suction inlet and an exhaust force in an exhaust outlet. The motor and fan assembly airflow exhaust outlet can be in fluid communication with an exhaust grill (not visible) covering an exhaust duct (not visible). If desired, a final filter assembly can be provided for filtering the exhaust air stream of any contaminants which may have been picked up in the motor assembly immediately prior to its discharge into the atmosphere. The electric motor and fan assembly selectively established and maintains a flow of air from the main suction opening, via the suction inlet, to the exhaust outlet. The motor assembly suction inlet, on the other hand, is in fluid communication with the dust collector 20 of the vacuum cleaner 10 to generate a suction force therein.

Figure 4:
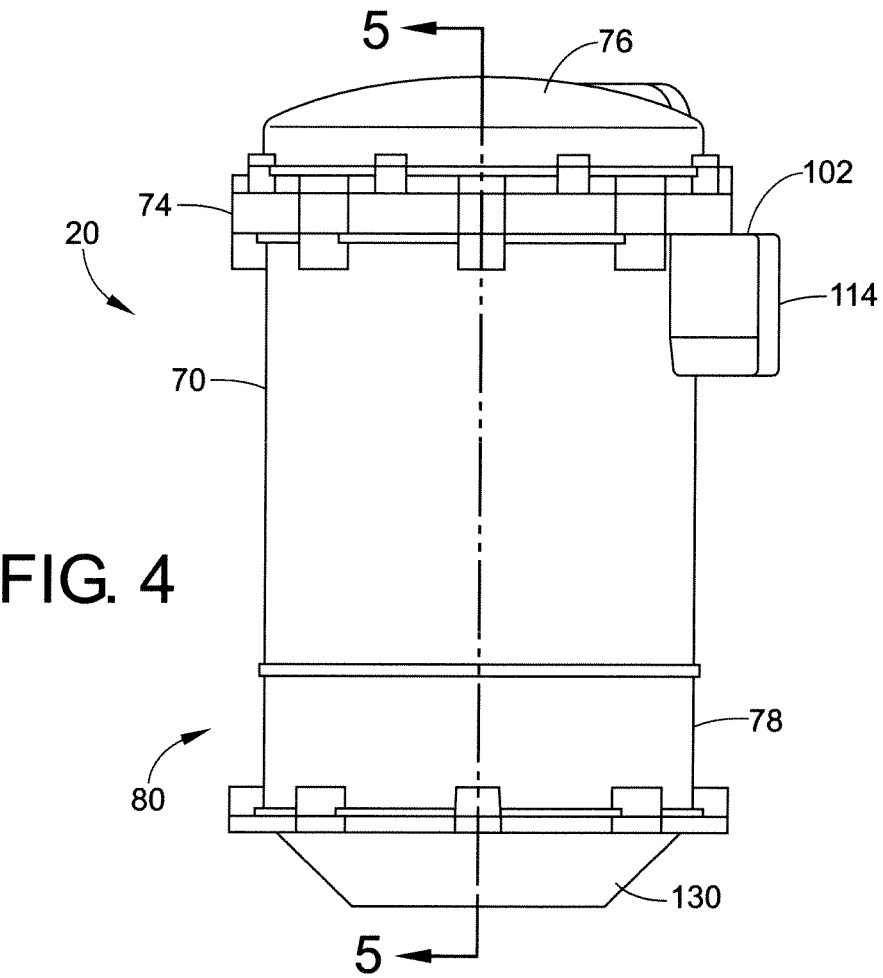
FIG. 4 is an enlarged side elevational view of the dust collector of FIG. 1.
Figure 6:
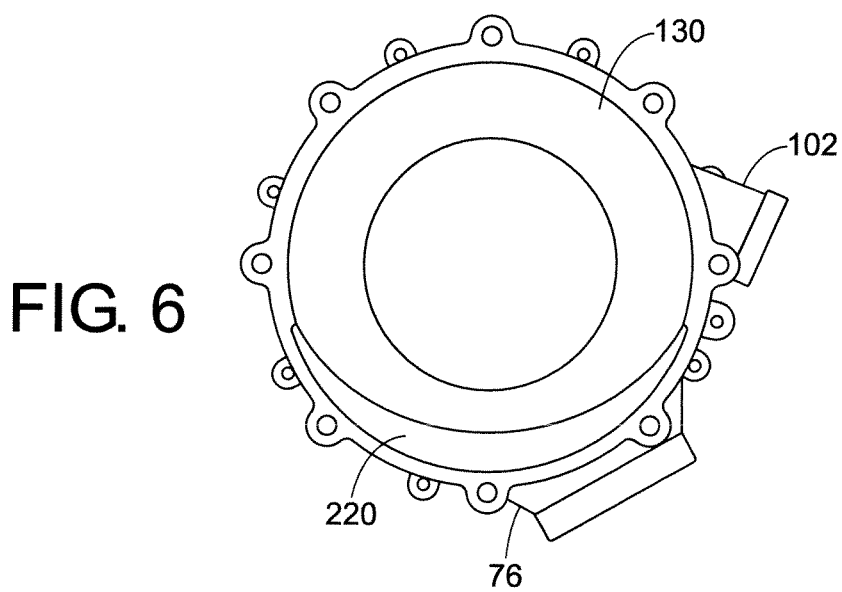
FIG. 6 is a bottom plan view of the dust collector of FIG. 4.
Figure 5:
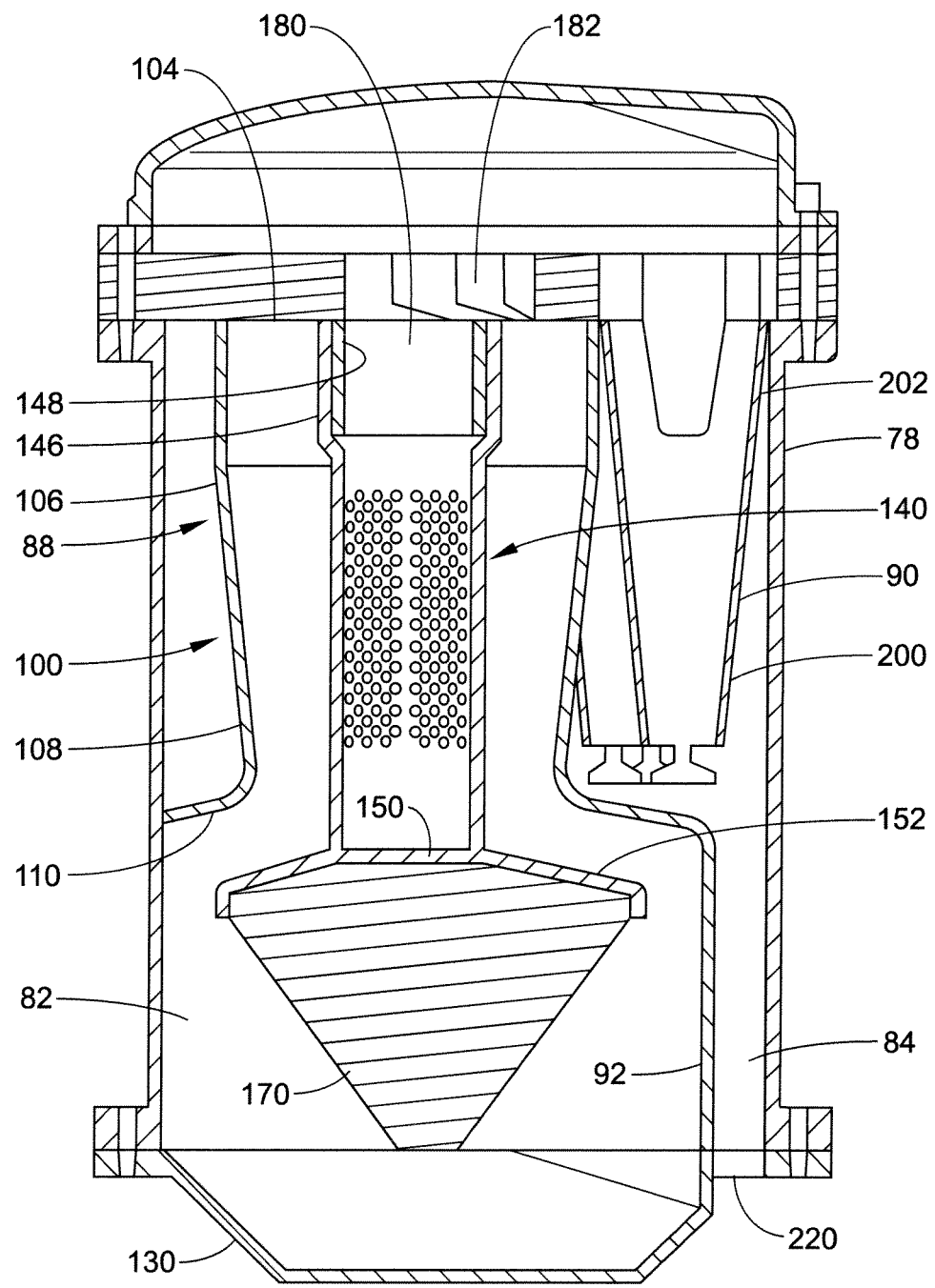
FIG. 5 is a cross-sectional view of the dust collector of FIG. 4 taken generally along the line 5-5 of FIG. 4.

With reference now to FIGS. 4-6, the dust collector 20 comprises a cyclone main body 70 including an outer wall 78. As shown, the cyclone main body has a uniform outer circumference. Particularly, the cross-sectional shape of the cyclone main body 70 along any plane taken generally normal to a longitudinal axis defined by the cyclone body is generally constant. In the depicted embodiment, the cyclone main body is cylindrical in shape and has a generally constant radius or diameter. An air manifold 74 and cover unit 76 are attached to an upper portion of the wall 78 of the cyclone main body. A lower portion of the cyclone main body wall 78 at least partially defines a dirt cup 80. The dirt cup includes a first dust collection chamber 82 and a second dust collection chamber 84. The cyclone main body 70 includes a first cyclone part 88 and a second cyclone part 90. As will be described in greater detail below, the first and second dust collection chambers are configured to independently store and empty dirt and dust particles separated by the respective first and second cyclone parts. The cyclone main body 70 can be made of a transparent material so that the presence of dirt can be seen in the dust collector 20.

As shown in FIG. 5, an inner wall portion 92, which at least partially defines the first dust collection chamber 82, acts as a barrier between the first and second dust collection chambers 82 and 84. The barrier is curved toward the second dust collection chamber such that the first collection chamber can be formed in a substantially cylindrical shape. Thus, the first and second dust collection chambers are completely separated from each other such that the airflow in one of the chambers does not affect the airflow in the other of the chambers. This further improves the dust collection efficiency of the dust collector 20. The dirt cup 80 has a generally constant radius. As shown, the first and second collection chambers each have a non-constant radius. Specifically, the first dust collection chamber 82 is at least partially defined by the main body wall 78 and the inner wall portion 92. The radius of the main body wall 78, as measured from a longitudinal axis defined by the dirt cup 80, is generally constant. The radius of the inner wall portion 92, as measured from the longitudinal axis of the dirt cup, varies along its arcuate length. Regarding the second dust collection chamber 94, a lower portion of the second dust collection chamber, which is also is at least partially defined by the main body wall 78 and the inner wall portion 92, is generally crescent shaped.

The first cyclone part 88 comprises a generally frustoconical shaped first stage cyclone separator 100. The separator 100 has a longitudinal axis offset from the longitudinal axis of the cyclone main body 70. This allows the cyclone main body to accommodate the second cyclone part by providing a space for the second cyclone part 90 without increasing the diameter of the cyclone main body. This also provides for a compact dust collector 20 and the appearance of a generally cylindrically shaped cyclone main body. The first stage separator includes a dirty air inlet conduit 102, a top wall 104 and a sidewall 106 having an outer surface and an inner surface. A lower end 108 of the first stage cyclone separator is secured to a lower skirt 110. As shown in FIG. 5, the lower skirt can be integrally formed with at least one of the cyclone main body 70 and inner wall portion 92.

The conduit 102 has an inlet section 114 in fluid communication with the dirty air conduit and an outlet section (not visible) in fluid communication with a dirty air inlet (not visible) of the first stage separator 100. The dirty air inlet of the separator can be generally rectangular in cross-section. It should be appreciated that the outlet section can have a varying dimension which allows the air stream to be drawn into the first stage separator 100 by way of the venturi effect, which increases the velocity of the air stream and creates an increased vacuum in the separator dirty air inlet. For example, the dirty air inlet conduit 102 can include a decreasing cross-sectional area. Alternatively, the dirty air conduit can transition from a rectangular cross-sectional area into a venturi-type discharge opening.

The airflow into the first stage separator 100 is tangential which causes a vortex-type, cyclonic or swirling flow. Such vortex flow is directed downwardly in the first stage separator by the top wall 104. Cyclonic action in the first stage separator 100 removes a substantial portion of the entrained dust and dirt from the suction air stream and causes the dust and dirt to be deposited in the first dust collection chamber 82 of the dirt cup 80.

Pivotally secured to a lower portion of the cyclone main body 70 is a first bottom plate or lid 130, which allows for emptying of the first dust collection chamber 82. A seal ring (not shown) can be fitted around the first bottom lid to create a seal between the first lid and the dirt cup. A first hinge assembly (not shown) can be used to mount the first bottom lid 130 to a bottom portion of the dirt cup. The first hinge assembly allows the first bottom lid to be selectively opened so that dirt and dust particles that were separated from the air stream by the first stage separator 100 can be emptied from the first dust collection chamber 82. A first latch assembly (not shown) can be located diametrically opposed from the first hinge assembly. Normally, the first latch assembly maintains the first bottom lid 130 in a closed position.

With reference to FIG. 5, fluidly connecting the first cyclone part 88 to the second cyclone part 90 is a perforated tube 140. The perforated tube is disposed within the first stage separator 100 and extends longitudinally from the top wall 104 of the separator. In the present embodiment, the perforated tube has a longitudinal axis generally coincident with the longitudinal axis of the first stage separator 100 and offset from the longitudinal axis of the cyclone main body 70.

An upper end 146 of the perforated tube can be releasably mounted to a mouth 148 extending downwardly from the top wall 104 of the first stage separator 100. In particular, the upper end of the perforated tube can have an inner diameter greater than an outer diameter of the mouth such that the mouth is received in the upper end. These two elements can be secured together by slotted openings, adhesives, frictional welding or the like. It can be appreciated that the perforated tube can be made removable from the dust collector 20 for cleaning purposes.

Connected to a lower, closed end 150 of the perforated tube 140 is a shroud 152 for retarding an upward flow of dirt and dust particles that have fallen below the lower end 108 of the first stage separator 100. Details of the perorated tube and shroud will be described below with respect to a second embodiment of the dust collector.

A laminar flow member, such as one or more baffles or fins 170, is mounted to one of the shroud 152 and the closed lower end 150 of the perforated tube 140. At least a portion of the laminar flow member is encircled by the shroud 152. The laminar flow member extends partially into the first dust collection chamber 82 and is positioned centrally within the first dust collection chamber. As shown in FIG. 5, the depicted baffle 170 can be cruciform in shape and include a cross blade assembly, which can be formed of two flat blade pieces that are oriented approximately perpendicular to each other. It should be appreciated that the baffles 170 are not limited to the configuration shown in FIG. 5 but may be formed of various shapes. For example, if a blade is employed, it can have a rectangular shape, a triangular shape or an elliptical shape, when viewed from its side. Also, in addition to a cross blade design, other designs are also contemplated. Such designs can include blades that are oriented at angles other than normal to each other or that use more than two sets of blades. These baffles can assist in allowing dirt and dust particles to fall out of the air stream between the perforated tube lower end 150 and the first bottom lid 130 of the first dust collection chamber 82.

With reference again to FIG. 5, an upper end or air outlet 180 of the perforated tube 140 is in fluid communication with an air inlet section 182 of the air manifold 74 positioned above the first stage separator 100. Details of the air manifold will be described below with respect to the second embodiment and a third embodiment of the dust collector.

The second cyclone part 90 comprises a plurality of spaced apart, frusto-conical, downstream, second stage cyclonic separators 200. The downstream separators 200 can be arranged in parallel and can be mounted on the air manifold 74 radially outside of the first cyclone part 88. In the depicted embodiment, the downstream separators 200 project downwardly from the air manifold such that uppermost end 202 of each downstream separator is located approximately in the plane defined by the top wall 104 of the first stage separator 100. The plurality of downstream separators are encased or surrounded by the wall 78 of the cyclone main body 70.

The dirt separated by each downstream separator 200 is collected in the second dust collection chamber 84. With reference again to FIG. 6, pivotally secured to the lower portion of the wall 78 of the cyclone main body 70 is a second bottom plate or lid 220, which allows for independent emptying of the second dust collection chamber 84. A seal ring (not shown) can be fitted around the second bottom lid to create a seal between the second lid and the dirt cup. A second hinge assembly (not shown) can be used to mount the second bottom lid 220 to the cyclone main body. The second hinge assembly allows the second bottom lid to be independently selectively opened so that dirt and dust particles that were separated from the air stream by the downstream separators 200 can be emptied from the second dust collection chamber 84. A second latch assembly (not shown) can be located on the dirt cup for selectively allowing the second bottom lid to be opened. Normally, the second latch assembly maintains the second bottom lid 220 in a closed position.

In operation, dirt entrained air passes into the upstream, first cyclone separator 100 through the inlet 102 which is oriented tangentially with respect to the sidewall 106 of the separator. The air then travels around the separation chamber where many of the particles entrained in the air are caused, by centrifugal force, to travel along the interior surface of the sidewall of the separator 100 and drop out of the rotating air flow by gravity. However, relatively light, fine dust is less subject to a centrifugal force. Accordingly, fine dust may be contained in the airflow circulating near the bottom portion of the dirt cup 80. Since the cross blade 170 extends into the bottom portion of the first dust collection chamber 82, the circulating airflow hits the blade assembly and further rotation is stopped, thereby forming a laminar flow. In addition, if desired, extending inwardly from the inner wall portion 92 can be laminar flow members (not visible) which further prevent the rotation of air in the bottom of the dirt cup. As a result, the most of the fine dust entrained in the air is also allowed to drop out.

The partially cleaned air travels through the perforated tube 140 and the air manifold 74 and into the frusto-conical downstream cyclonic separators 200. There, the air cyclones or spirals down the inner surfaces of the cyclonic separators before moving upward into the cover unit 76. Fine dirt separated in the downstream cyclonic separators collects in the second dust collection chamber 84. The cleaned air flows out of the downstream separators, through the cover unit and into an air inlet to the electric motor and fan assembly. To empty the dirt collected in the first dust collection chamber, the first bottom lid 130 can be opened. To empty the dirt collected in the second collection chamber, the second bottom lid 220 can be opened, independent of the first bottom lid. Each bottom lid can include a device to delay the opening of the bottom lid and/or moderate movement of the bottom lid, causing the bottom lid, on release from its closed position, to be opened smoothly yet steadily and slowly. This delayed or slowed movement prevents the dirt collected in each collection chamber 82, 84 from being reintroduced into ambient air. The device can include conventional damping devices, such as a spring, piston and the like, and/or a mechanism integrated in each bottom lid or the dirt cup 80. Alternatively, it can be appreciated that the first and second bottom lids 130, 220 can be opened at the same time so that the first and second dust collection chambers 82, 84 can be simultaneously emptied.

Similar to the aforementioned embodiment, a second embodiment of a dust collector for a vacuum cleaner is shown in FIGS. 7-13. Since most of the structure and function is quite similar, reference numerals with a single primed suffix (') refer to like components (e.g., first cyclone part 88 is referred to by reference numeral 88'), and new numerals identify new components in the additional embodiment.

With reference to FIGS. 7 and 8, an upright vacuum cleaner 300 generally includes an upright housing assembly 302, a nozzle base 304, and a dust collector 310 mounted to the upright housing assembly via conventional means. A handle 314 extends upward from the dust collector, by which an operator of the dual stage cyclone vacuum cleaner is able to grasp and maneuver the vacuum cleaner. An underside of the nozzle base includes a main suction opening (not shown) formed therein, which is in fluid communication with the dust collector 310 through a conduit (not shown), which directs dust-laden air tangentially into the dust collector. A base member 316 is mounted to a motor housing 318, containing an electric motor and fan assembly, for releasably supporting the dust collector 310. A latch assembly (not shown) can be mounted to the base member for releasably securing the dust collector thereto.

Figure 9:
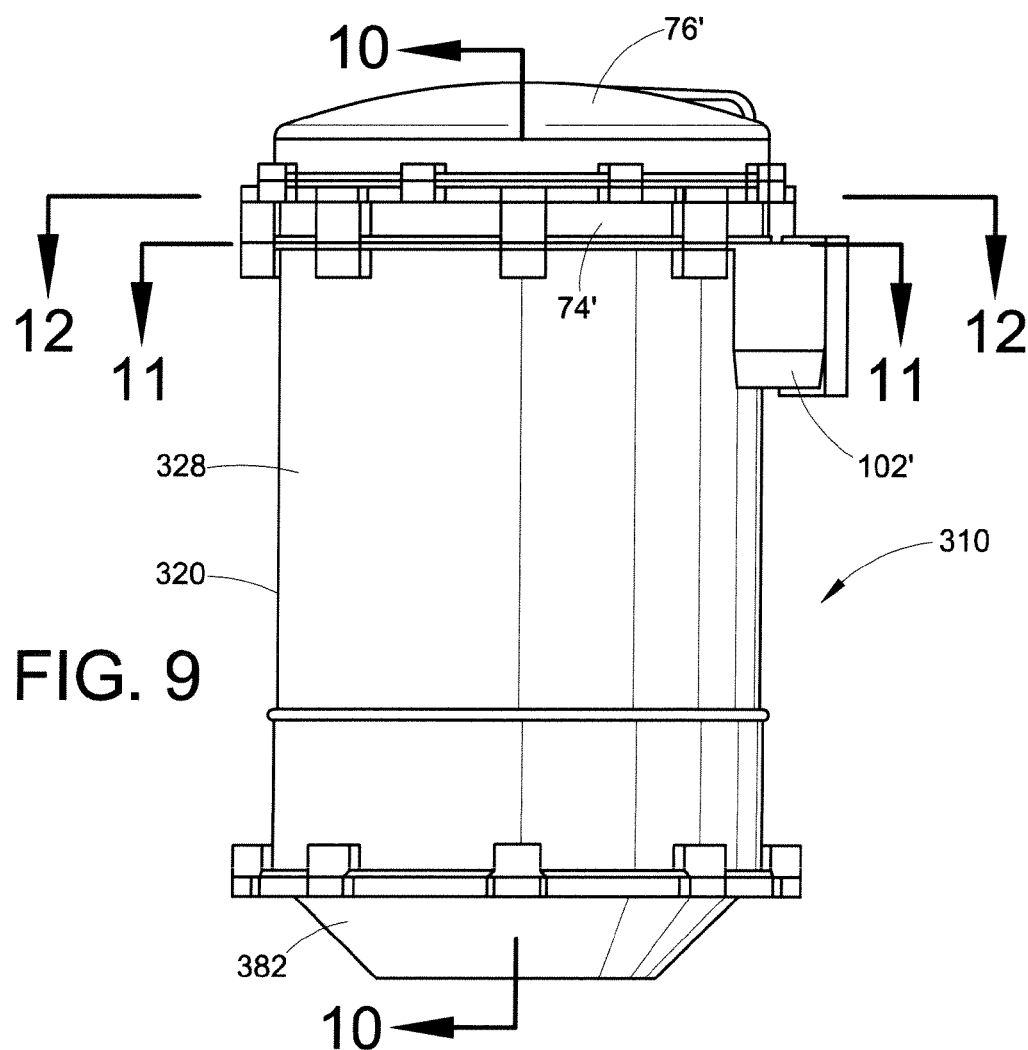
FIG. 9 is an enlarged side elevational view of the dust collector of FIG. 7.

With reference to FIGS. 9 and 10, the dust collector 310 includes a cyclone main body 320 having a uniform outer circumference. As shown, the cyclone main body is generally cylindrical; although, this is not required. An air manifold 74' and cover unit 76' attached to an upper portion of a wall 328 of the cyclone main body. The cyclone main body 320 includes a first cyclone part 88' and a separate second cyclone part 90'. The first cyclone part comprises a generally frusto-conical shaped first stage cyclone separator 100'. The first stage separator includes a dirty air inlet conduit 102'. A lower end 108' of the first stage cyclone separator is secured to a lower skirt 330. As shown in FIG. 10, the lower skirt can be integrally formed with the cyclone main body 320. The lower skirt and the cyclone main body together at least partially define a first dust collection chamber 340. In this embodiment, the first dust collection chamber 340 has a generally constant radius.

With continued reference to FIG. 10, fluidly connecting the first cyclone part 88' to the second cyclone part 90' is a perforated tube 140'. The perforated tube can be releasably disposed within the first stage separator 100' and extends longitudinally from a top wall 104' of the separator. In the depicted embodiment, the perforated tube includes a generally cylindrical section 350. A plurality of openings or perforations 352 is located around a portion of the circumference of the cylindrical section. The openings are useful for removing threads and fibers from the air stream which flows into the perforated tube.

As might be expected, the diameter of the openings 352 and the number of those openings within the perforated tube 140' directly affect the filtration process occurring within the tank. Also, additional openings result in a larger total opening area and thus the airflow rate through each opening is reduced. Thus, there is a smaller pressure drop and lighter dust and dirt particles will not be as likely to block the openings. The openings 352 serve as an outlet from the first stage separator 100', allowing the partially cleaned fluid to enter the second cyclone part 90'. It should be appreciated that the cylindrical section 350 can have a varying dimension which allows the air stream to be drawn into the perforated tube by way of the venturi effect, which increases the velocity of the air stream flowing through the perforated tube and creates an increased vacuum in the openings 352. For example, the cylindrical section can include a decreasing cross-sectional area. The perforated tube 140' can also include at least one fin (not shown) mounted to an inside surface of the cylindrical section 350 and extending generally longitudinally through the perforated tube. The at least one fin eliminates cyclonic flow inside the perforated tube.

Similar to the previous embodiment, a shroud 352 is connected to a lower, closed end 150' of the perforated tube 140'. The shroud has an outwardly flared section 354 and a flange 356 extending downwardly from the flared section. As is best illustrated in FIG. 10, the shroud includes a first portion 358 and a second portion 360, the first portion having a greater dimension than the second portion. This allows a laminar flow member 170', which is mounted to one of the shroud and the closed lower end 150' of the perforated tube 140', to be positioned in the center of the first dust collection chamber 340. A diameter of the shroud 352, particularly an end of the outwardly flared section 354, is larger than a diameter of the separator lower end 108' and an inside diameter of the first dust collection chamber 340 is substantially larger than the diameter of the separator lower end. This prevents dust from being picked up by flow of air streaming from the first dust collection chamber toward the openings 352 of the perforated tube 140'. The shroud flared section 354, which is generally parallel to the lower skirt 330, and the lower skirt define a first air channel 364. The shroud flange 356, which is generally parallel to the cyclone main body wall 328, and the wall define a second air channel 366. The first and second air channels direct air from the first stage separator 100' into the first dust collection chamber 340. The first air channel and the second air channel can have a substantially constant volume for maintaining airflow velocity. Also, the volume of the first air channel can be approximately equal to the volume of the second air channel.

Figure 11:
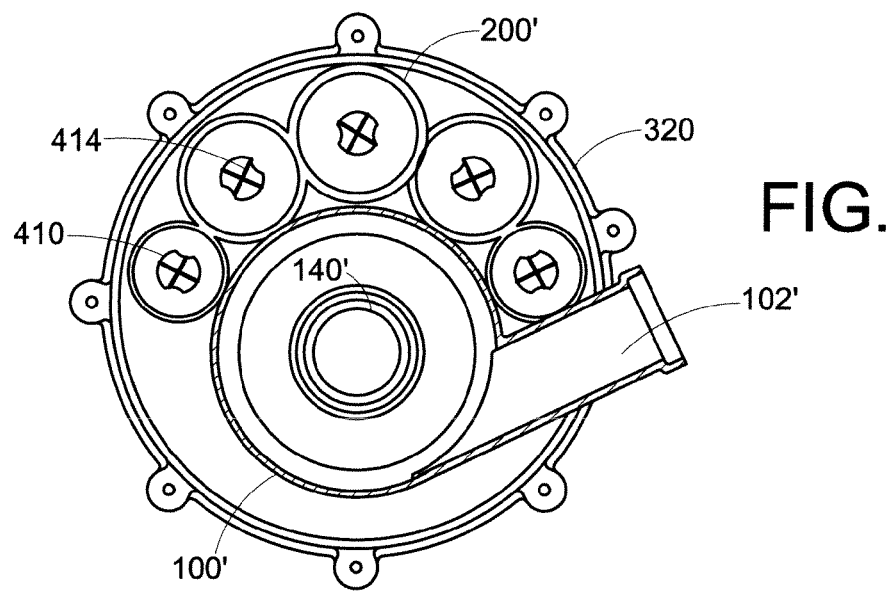
FIG. 11 is a cross-sectional view of the dust collector of FIG. 9 taken generally along the line 11-11 of FIG. 9.

With reference to FIGS. 10 and 11, the second cyclone part 90' comprises a plurality of spaced apart, frusto-conical, downstream, second stage cyclonic separators 200' arranged in parallel and mounted radially on the air manifold 74' outside of the first cyclone part 88'. The plurality of downstream separators are at least partially encased or surrounded by the wall 328 of the cyclone main body 320 and a wall 106' of the first stage separator 100'. The walls 106' and 328 together at least partially define a second dust collection chamber 380.

Each second stage or downstream separator 200' can have a dimensional relationship such that a diameter of its upper end is three times the diameter of its lower end. This relationship is seen to improve the efficiency of cyclonic separation. As shown in FIG. 11, because a longitudinal axis of the first stage separator 100' is offset from a longitudinal axis of the cyclone main body 320, the second dust collection chamber 380 is crescent shaped. Thus, the upper end diameter of each downstream separator 200' can vary. Particularly, a diameter of an upper end of one of the downstream separators can be different from a diameter of an upper end of another one of the downstream separators. As shown, the second cyclone part 90' includes five cyclonic separators 200'. Although, it should be appreciated that more or less than five cyclonic separators can be mounted on the air manifold 74'. For example, the cyclonic separators can surround the first stage cyclone separator 100' except for its dirty air inlet conduit 102'. In that regard, the larger diameter downstream separators can be located in the enlarged space created by the offset, and the smaller space created by the offset can be fitted with increasingly smaller diameter downstream separators.

Figure 13:
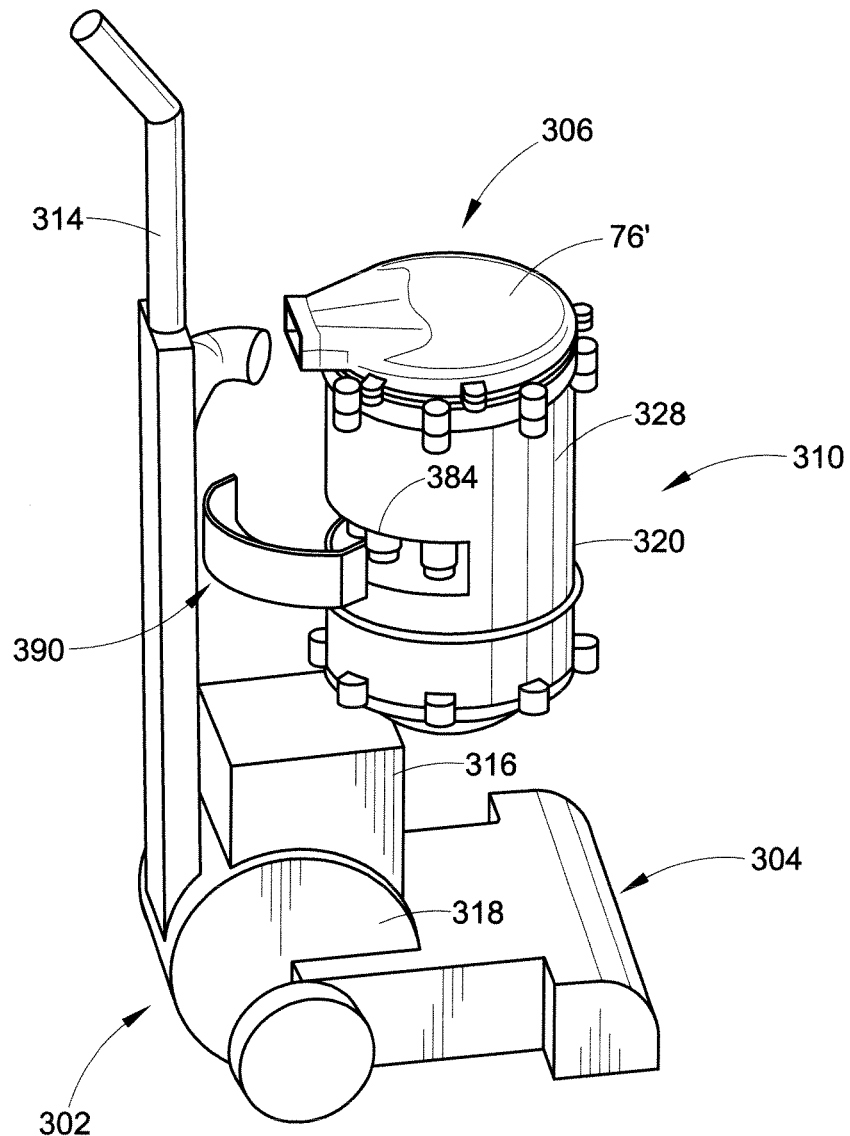
FIG. 13 is an exploded perspective view of the vacuum cleaner of FIG. 7, showing the dust collector in a detached position.
Figure 14:
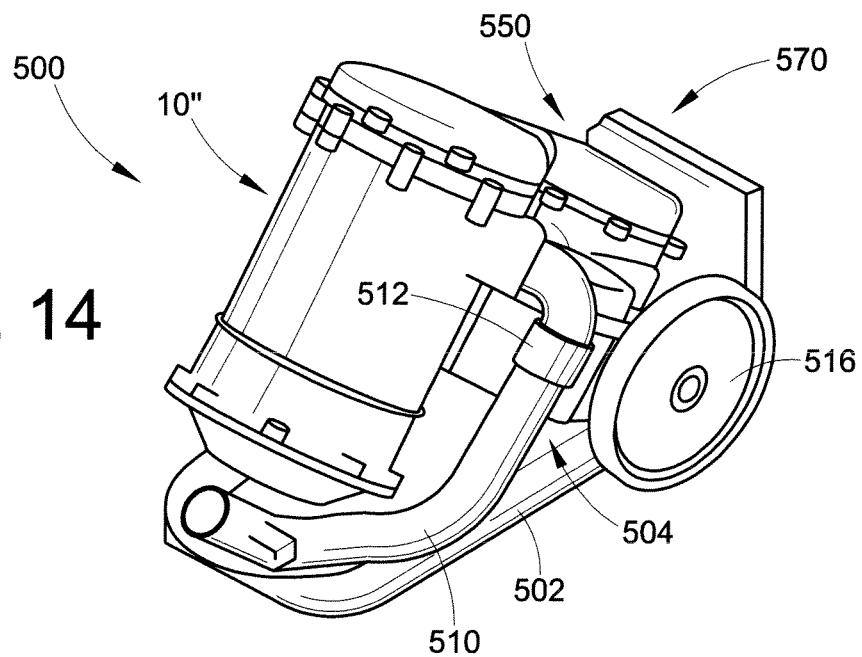
FIG. 14 is a front perspective view of a canister vacuum cleaner employing the dust collector of FIG. 7, according to still another embodiment of the present disclosure.
Figure 15:
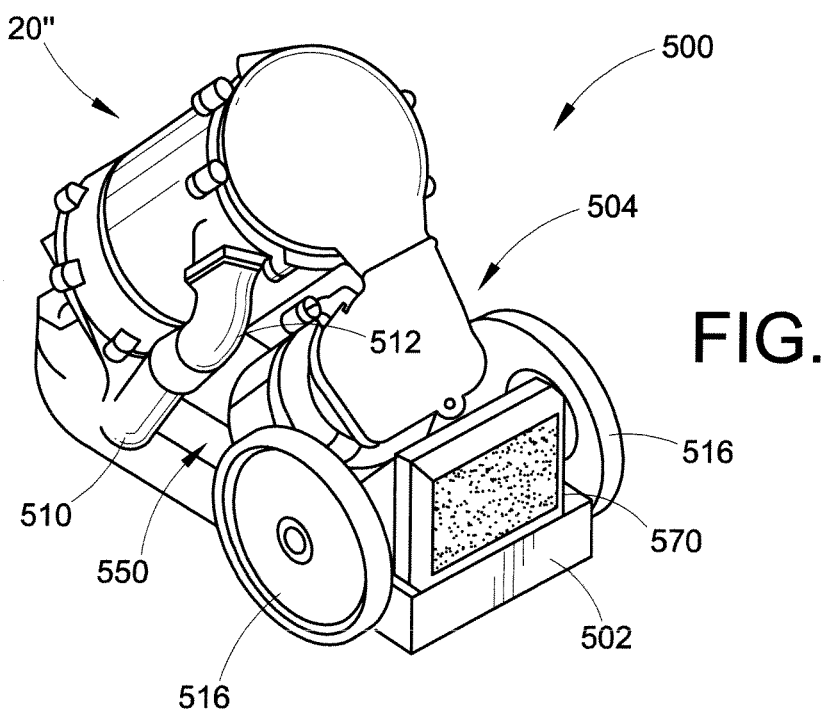
FIG. 15 is a rear perspective view of the canister vacuum cleaner of FIG. 14.
Figure 16:
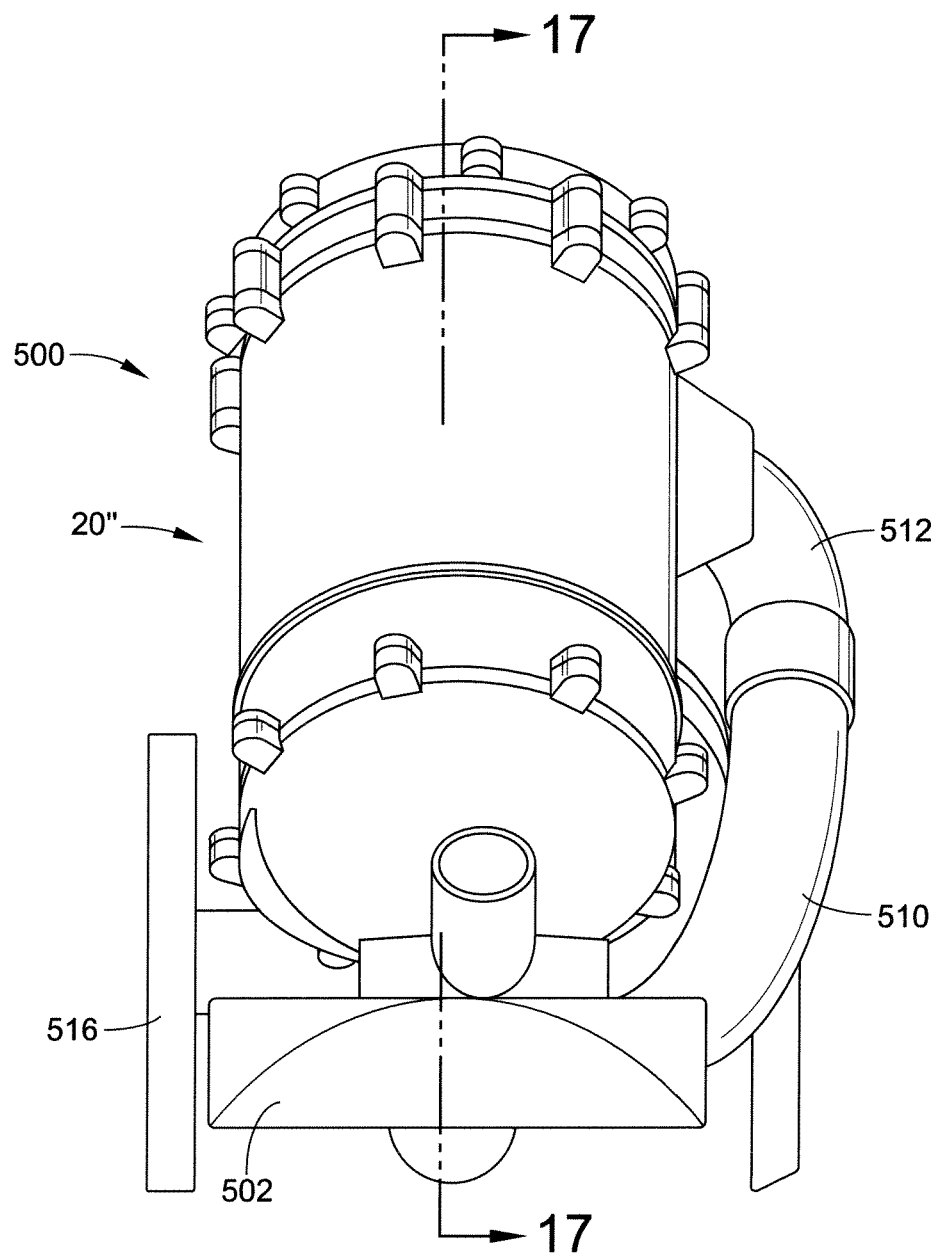
FIG. 16 is a front perspective view of the canister vacuum cleaner of FIG. 14.

Similar to the first embodiment, the first and second dust collection chambers 340, 380, respectively, are configured to independently store and empty dirt and dust particles separated by the respective first and second cyclone parts 88', 90'. Pivotally secured to a lower portion of the cyclone main body 320 is a first bottom plate or lid 382. As shown in FIGS. 8 and 13, the cyclone main body wall can include a sidewall opening 384 which allows for removal of the dirt particles collected in the second dust collection chamber 380. A drawer 390 can be removably received in the opening 384 for collecting separated dust particles. The drawer can include a handle or like means (not shown) for allowing a user to grip the drawer and remove the drawer so that dust collected in the second dust collection chamber can be emptied. A seal (not shown) can be fitted around the drawer 390 to create a seal between the drawer and wall 328. A conventional latch assembly can be used to maintain the drawer in a closed position. It should be appreciated that alternate means for removing dust separated by the downstream separators 270 is contemplated. For example, an opening cover can be removably attached to the wall 328. The dust collected in the second dust collection chamber 380 can also be emptied into first dust collection chamber 340. In this design, a dump door can be formed in the lower skirt 330. The door can be actuated by a button or lever.

With reference again to FIGS. 10 and 12, an upper end or air outlet 180' of the perforated tube 140' is in fluid communication with an air inlet section 182' of the air manifold 74' positioned above the first stage separator 100'. The air manifold, which directs partially cleaned air flowing from the perforated tube to the second cyclone part 90', includes a bottom guide plate or wall 400 and a top guide plate or wall 402 provided under the cover unit 76'. A generally continuous barrier 404 sandwiched between the bottom and top walls defines an air passage or conduit from the manifold air inlet section 182' to the second cyclone part 90'.

A plurality of generally cylindrical shaped discharge guide tubes 410 project downwardly from the bottom wall 402. Each of the discharge guide tubes has a longitudinal axis generally coincident with a longitudinal axis of each downstream separator 200'. The discharge guide tubes direct the cleaned air exhausted from the second cyclone part 90' into the cover unit 76'. Each discharge guide tube can include a laminar flow member to stop the air from circulating within the discharge tube. As shown in FIGS. 10-12, the laminar flow member can be a generally cross-shaped baffle 414. However, it should be appreciated that other shapes are also contemplated. A portion of each baffle projects a predetermined distance from a lowermost end 416 of each discharge guide tube into the interior of each downstream cyclone 200'. The cross-sectional area of the baffle at any point along its length is generally cross-shaped.

In the depicted embodiment, the plurality of downstream separators 200', which are arranged in parallel and mounted radially outside the first cyclone part, project downwardly from the bottom wall 400. As shown in FIG. 10, an uppermost end of each downstream separator is located in a plane defined by the top wall 104' of the first separator 100'. The downstream separators include a dirty air inlet 420 in fluid communication with the air passage defined by air manifold. In particular, the air passage is separated into a plurality of isolated air conduits 422 by a plurality of dividing walls 430 extending inwardly from the barrier 404. The dividing walls at least partially surround the dirty air inlet of each downstream separator. Each manifold air conduit 422 has an air outlet 434 which directs a volume of partially cleaned air generally tangentially into the inlet 420 of each second stage separator 200'. This causes a vortex-type, cyclonic or swirling flow. Such vortex flow is directed downwardly in the downstream separator since a top end thereof is blocked by the bottom wall 400.

With reference again to FIG. 10, each downstream separator includes a dust blocking member 450 having a connection member 452 and a dust blocking plate 454. The connecting member is mounted to a lower end of each downstream separator. In this embodiment, an upper portion of the connecting member is integrally formed with the separator lower end; although, this is not required. The dust blocking plate 454 is attached to a lower portion of the connecting member so as to be spaced from a particle outlet 458 of the downstream separator by a predetermined distance. The blocking plate limits turbulence in the second dust collection chamber 380 and prevents re-entrapment of dirt that has fallen into the second dust collection chamber into the cleaned air exiting each downstream separator. The lower end of each second stage separators 200' and a bottom surface of the dust blocking plate 454 can be inclined at an acute angle of approximately fifteen degrees (15°) relative to a longitudinal axis of each separator. This configuration allows dirt to easily pass downwardly through the particle outlet 458 and into the second dust collection chamber reducing risk of dirt collecting in the area of the particle outlet and causing a blockage.

As indicated previously, each of the discharge guide tubes 410 direct the cleaned air exhausted from the second cyclone part 90' into the cover unit 76' before being discharged to an inlet of the electric motor and fan assembly. As to a further discussion of the manner of usage and operation of the second embodiment, the same should be apparent from the above description relative to the first embodiment. Accordingly, no further discussion relating to the manner of usage and operation will be provided.

With reference now to FIGS. 14-17, a canister vacuum cleaner 500 utilizing a dust collector according to one of the aforementioned embodiments is illustrated. In the depicted embodiment, the dust collector is substantially similar to dust collector 20. Reference numerals with a double primed suffix (") refer to like components (e.g., dust collector 20 is referred to by reference numeral 20"), and new numerals identify new components in this third embodiment.

With reference to FIGS. 14-17, the canister vacuum cleaner 500 generally includes a base member 502, an electric motor and fan assembly 504 and dust collector 20" supported on the base member, and a hose and nozzle assembly (not shown), which is in fluid communication with the dust collector through a conduit 510 and hose fitting 512. The conduit directs dust-laden air tangentially into the dust collector. A latch assembly (not shown) can be mounted to the base member 502 for releasably securing the dust collector thereto. The base member 502 can include a handle (not shown) and/or a carrying strap (not shown) to facilitate carrying of the vacuum cleaner. One or more wheels 516 are rotatably connected to a rear end section of the base member. A wheel assembly, such as a caster wheel 518 or the like, for steering of the vacuum cleaner, is connected to a forward end section of the base member. The wheels 516 and wheel assembly 518 moveably support the vacuum cleaner 500 on a floor or other support surface. A cord-reel device (not shown) can be mounted to the base member. The cord-reel can be either spring loaded or hand-operated.

Figure 17:
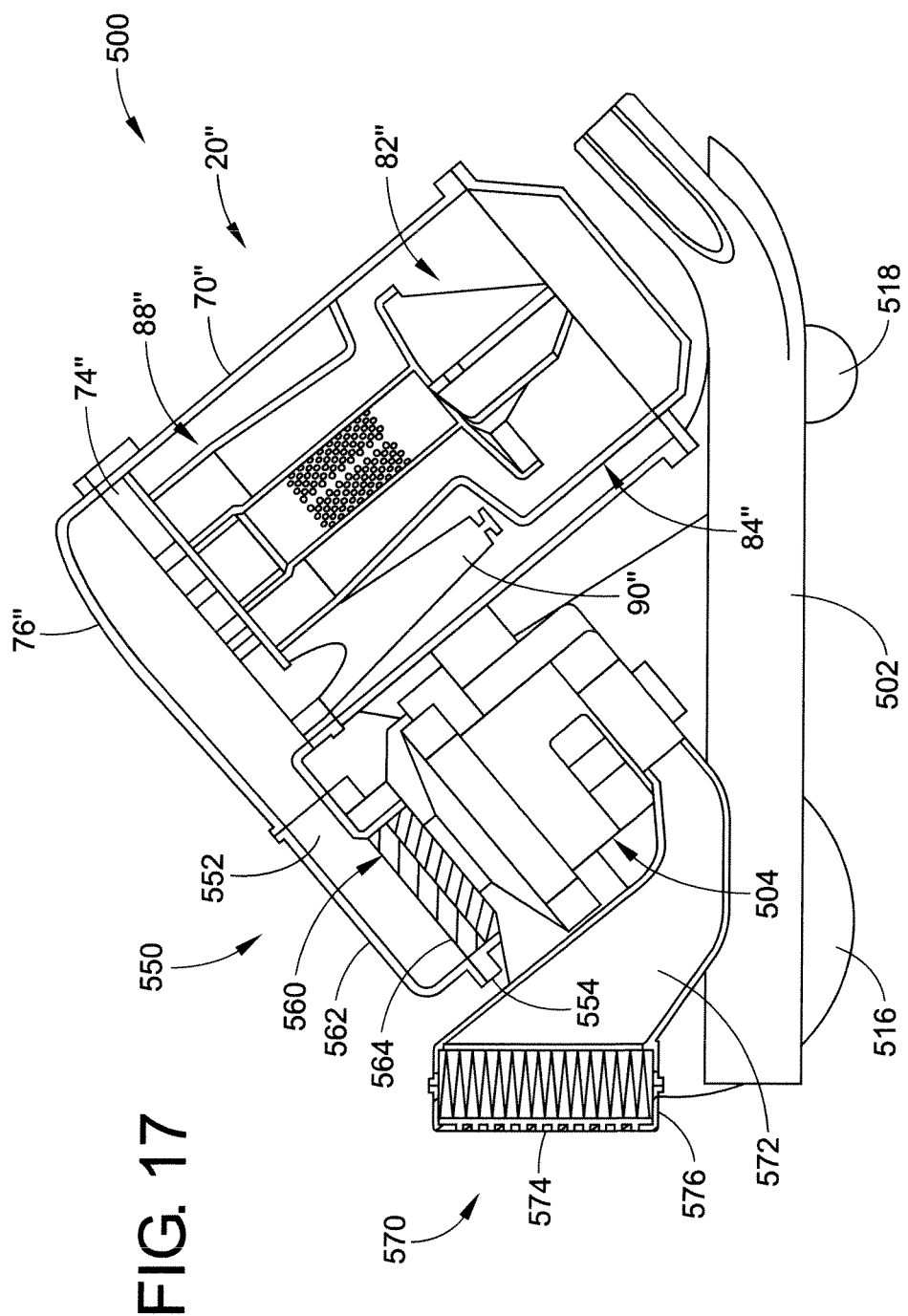
FIG. 17 is a cross-sectional view of the canister vacuum cleaner of FIG. 16 taken generally along the line 17-17 of FIG. 16.
Figure 18:
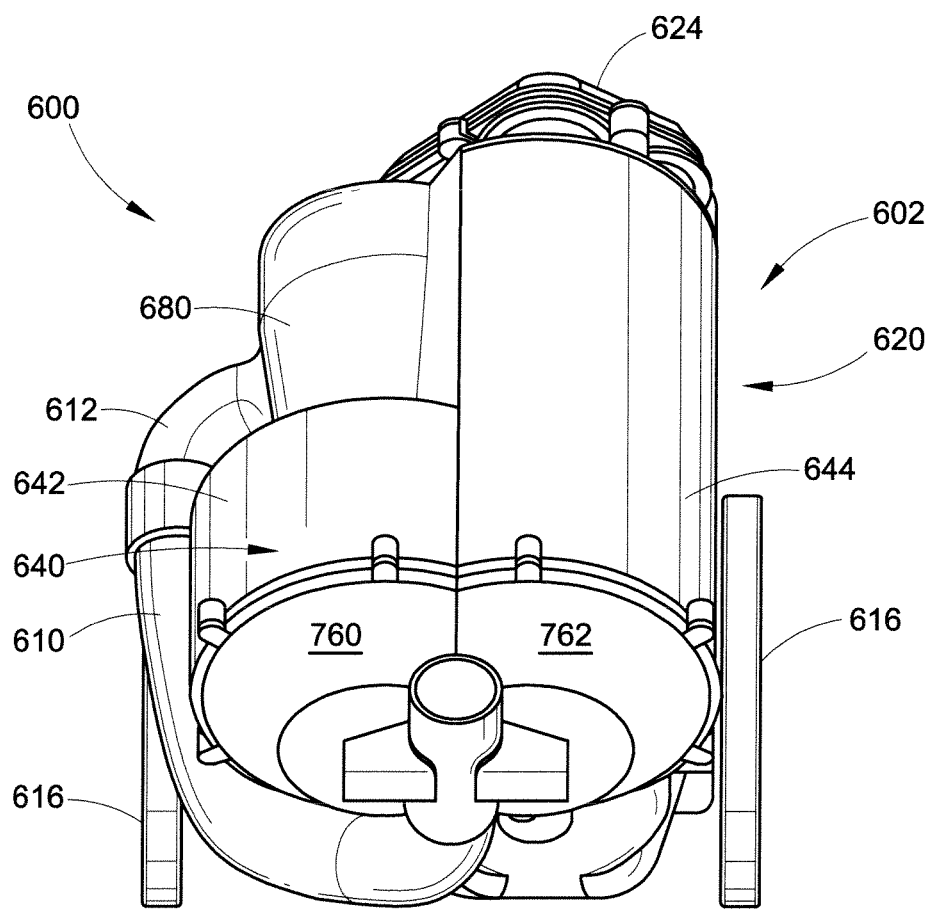
FIG. 18 is a front perspective view of a canister vacuum cleaner including a dual stage cyclonic dust collector in accordance with a fourth aspect of the present disclosure.

Similar to the first embodiment, and with reference now to FIG. 17, the dust collector 20" includes a generally cylindrical cyclone main body 70" and an air manifold 74" and cover unit 76" attached to an upper portion of the cyclone main body. A lower portion of the cyclone main body at least partially defines a first dust collection chamber 82" and a separate, second dust collection chamber 84". The cyclone main body includes a first cyclone part 88" and a separate second cyclone part 90". Since the structure of dust collector 20" is similar to dust collector 20, detailed description thereof will be omitted for conciseness.

As indicated previously, cleaned air exhausted from the dust collector 20" is directed into the cover unit 76" before being discharged to a filter assembly 550. As shown in FIG. 17, the filter assembly includes a top plenum 552 releasably secured to a bottom plenum 554. An inlet of the top plenum is connected to the cover unit 76". The top plenum collects a flow of cleaned air from the dust collector and directs the cleaned air through a filter element 560 for filtering any remaining fine dust remaining in the airflow exiting the downstream separators. The bottom plenum 554 collects a flow of cleaned air from the filter element 560 and merges the flow of cleaned air into the inlet of the electric motor and fan assembly 504.

In this embodiment, a two stage filter element 560 is disclosed. It can include at least one foam filter. Such foam filter can be a compound member having a coarse foam layer 562 and a fine foam layer 564, at least partially housed in the bottom plenum 554. The two foam layers can, if desired, be secured to each other by conventional means. The two stage filter element 560 can be easily serviced by removing the top plenum from the bottom plenum. For example, the top plenum 562 can be hinged to provide access to the filter element 560 for cleaning. Alternately, or in addition, a pleated filter can be employed.

Similar to the previous embodiments, the electric motor and fan assembly 504 generates the required suction airflow for cleaning operations by creating a suction force in a suction inlet and an exhaust force in an exhaust outlet. The motor and fan assembly airflow exhaust outlet is in fluid communication with an exhaust assembly 570. The exhaust assembly includes an exhaust duct 572 and an exhaust grill 574 covering an outlet of the exhaust duct. The exhaust duct can have an increasing cross-sectional area to reduce the velocity of the exhaust airflow. A pleated filter 576, such as a HEPA filter, can be provided for filtering the exhaust air stream of any contaminants which may have been picked up in the motor assembly immediately prior to its discharge into the atmosphere.

Although not illustrated, it should be appreciated that the electric motor and fan assembly 504 can include an ultraviolet (UV) germicidal light source. The UV light is not mounted in the cyclone cover 76" or filter assembly 550 because the foam filters are generally sensitive to UV-C radiation and tend to disintegrate. The UV light source generates a magnetic or electric field capable of emitting radiation powerful enough to destroy bacteria and viruses. The UV light source can be disposed in close proximity to the HEPA filter 576 so that the UV light source can shine on the filter. It has been proven that the residence time of bacteria, fungi and/or viruses trapped in or on the filter is great enough that exposure to the UV light source will either destroy the micro-organism or neutralize its ability to reproduce. The UV light source can be electrically connected to the same power source that powers the electric motor and fan assembly 504.

Another embodiment of a dust collector 602 for a vacuum cleaner, such as the illustrated canister vacuum cleaner 600, is shown in FIGS. 18-21.

The canister vacuum cleaner 600 generally includes a base member (not shown), an electric motor and fan assembly 604, a dust collector 602 supported on the base member, and a hose and nozzle assembly (not shown), which is in fluid communication with the dust collector through a conduit 610 and a hose fitting 612. The conduit directs dust-laden air tangentially into the dust collector. A latch assembly (not shown) can be mounted to the base member for releasably securing the dust collector thereto. One or more wheels 616 are rotatably connected to a rear end section of the base member. A wheel assembly (not shown) for steering of the vacuum cleaner is connected to a forward end section of the base member.

With continued reference to FIGS. 18-21, the dust collector 602 includes a cyclone main body 620 having a non-uniform outer circumference. Particularly, the cross-sectional shape of the cyclone main body 620 along any plane taken generally normal to a longitudinal axis defined by the cyclone body is not constant. An air manifold 622 and cover unit 624 are attached to an upper portion of a wall 628 of the cyclone main body. A lower portion of the wall 628 at least partially defines a dirt cup 640. The dirt cup includes a first dust collection chamber 642 and a separate second dust collection chamber 644. The cyclone main body further includes a first cyclone part 650 and a separate second cyclone part 652. The first and second dust collection chambers are configured to independently store and empty dirt and dust particles separated by the respective first and second cyclone parts. The cyclone main body 620 can be made of a transparent material so that the presence of dirt can be seen in the dust collector 602.

The first cyclone part 650 comprises a generally frusto-conical shaped first stage cyclone separator 670 mounted atop the first dust collection chamber 642. The second cyclone part comprises a plurality of spaced apart, frusto-conical, downstream, second stage cyclonic separators 672. The cyclone main body 620 at least partially encases or surrounds the plurality of downstream separators.

The first stage separator 670 includes a dirty air inlet conduit 676, a top wall 678 and a sidewall 680 having an outer surface and an inner surface. The outer surface of the sidewall forms at least a part of an external surface of the vacuum cleaner 600. A lower end 682 of the first stage cyclone separator is secured to a lower skirt 684, which can be integrally formed with a portion of the cyclone main body wall 628.

Figure 19:
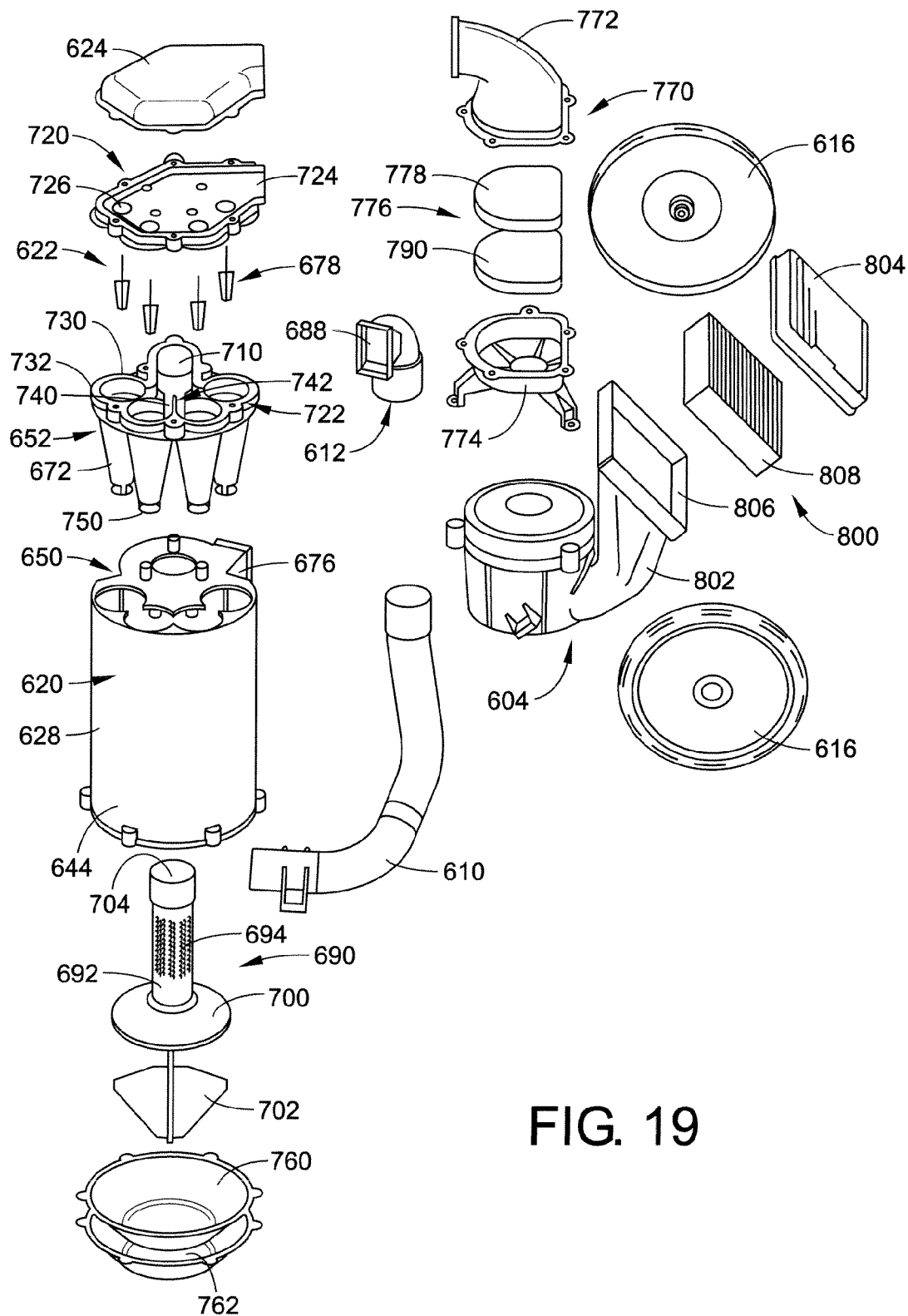
FIG. 19 an exploded perspective view of the canister vacuum cleaner of FIG. 18, together with associated components thereof.

The dirty air inlet conduit 610 has an inlet section in fluid communication with the hose fitting 612 and an outlet section in fluid communication with a dirty air inlet 686 of the first stage separator. The dirty air inlet of the separator can be generally rectangular in cross-section. As shown in FIG. 19, an outlet section 688 of the hose fitting 612 can have a varying cross-sectional area which allows the air stream to be drawn into the first stage separator 670 by way of the venturi effect, which increases the velocity of the air stream and creates an increased vacuum in the separator dirty air inlet.

Figure 20:
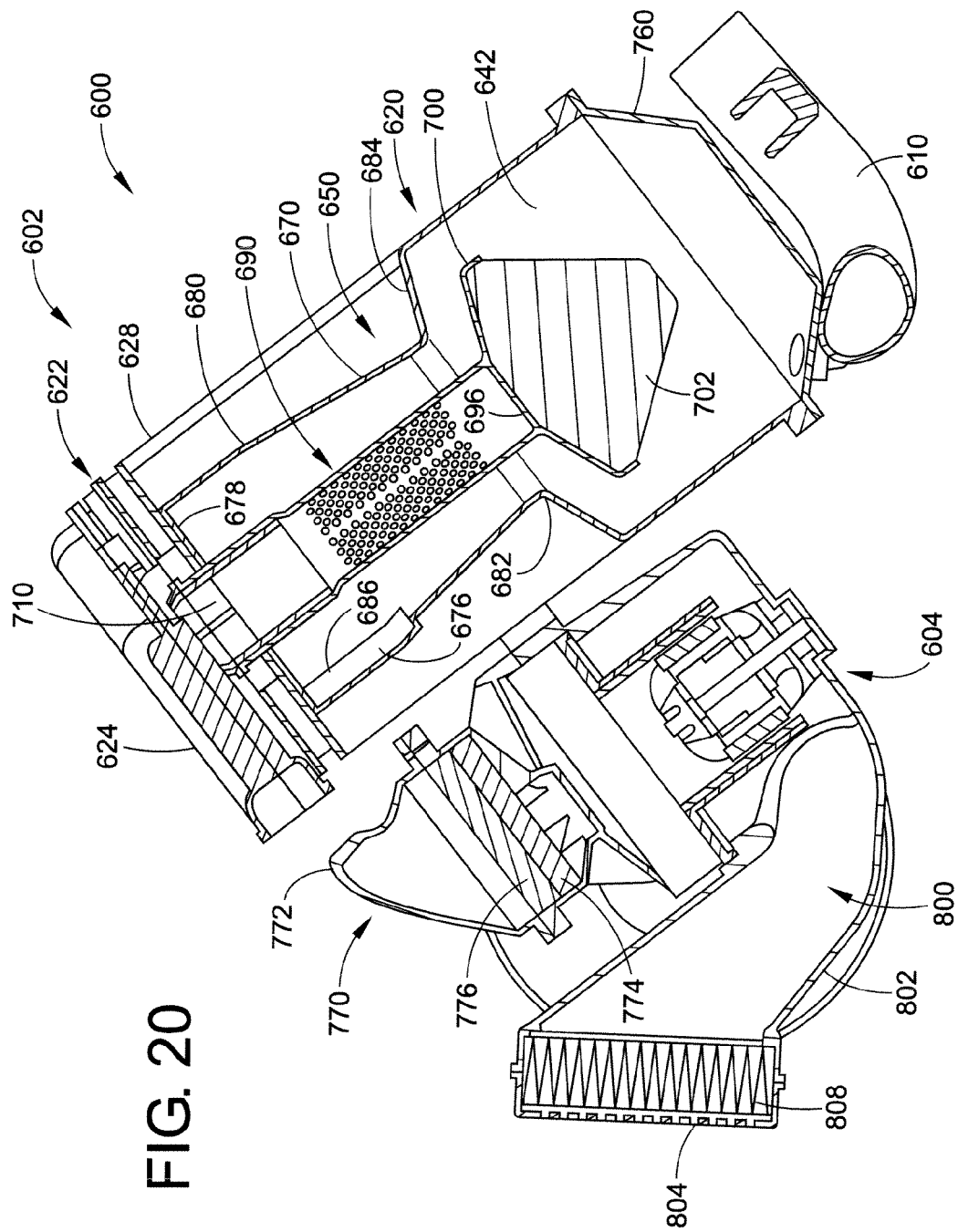
FIG. 20 is a side cross-sectional view of the canister vacuum cleaner of FIG. 18.
Figure 21:
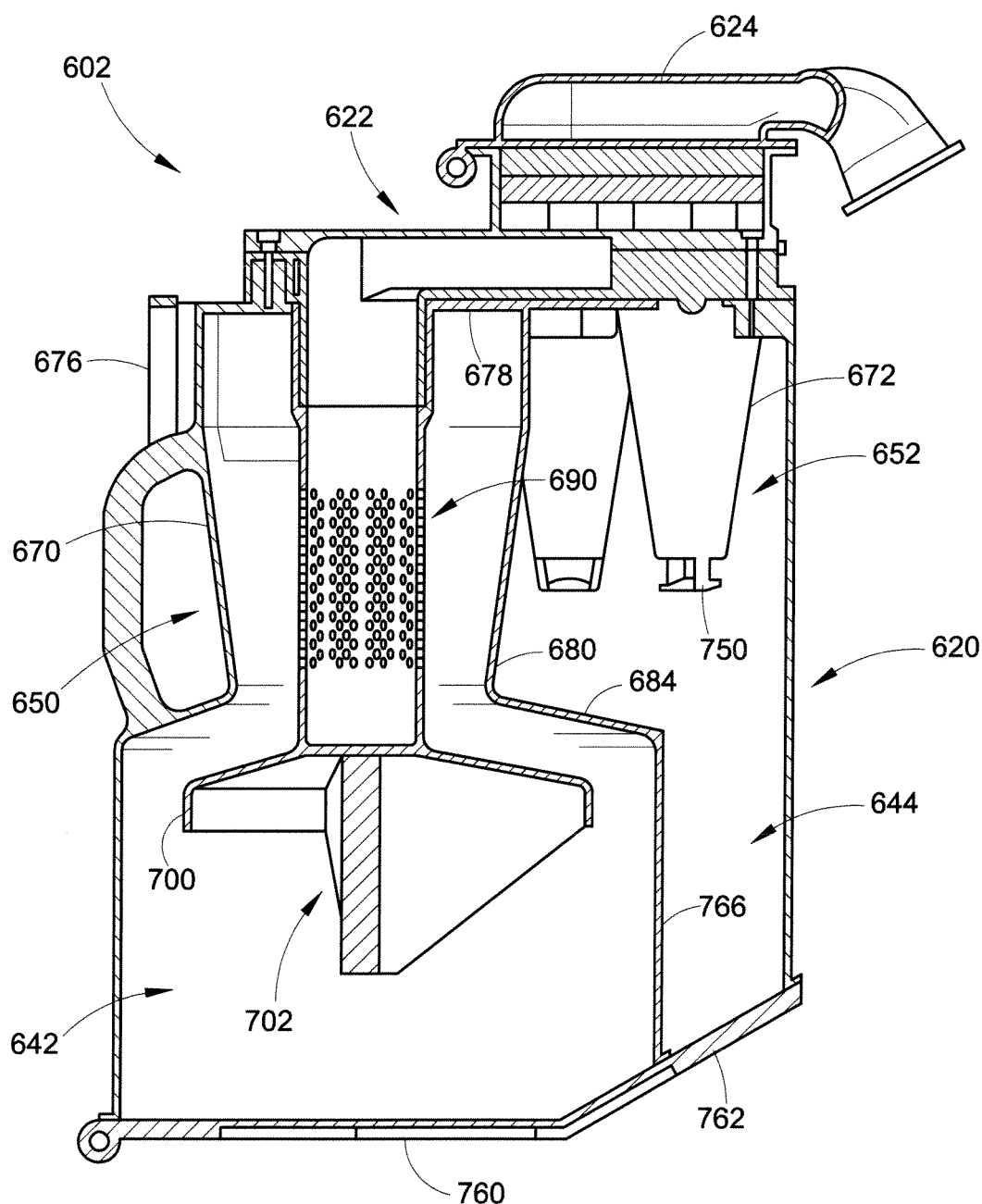
FIG. 21 is a side cross-sectional view of the canister vacuum cleaner of FIG. 18.

With continued reference to FIGS. 19-21, fluidly connecting the first cyclone part 650 to a second cyclone part 652 is a perforated tube 690. The perforated tube can be removably disposed within the first stage separator 670. Similar to the previous embodiments, the perforated tube includes a generally cylindrical section 692 and a plurality of openings or perforations 694 located around a portion of the circumference of the cylindrical section. Connected to a lower, closed end 696 of the perforated tube 690 is a shroud 700 and laminar flow member 702. An upper end or air outlet 704 of the perforated tube 690 is in fluid communication with an air inlet section 710 of the air manifold 622.

The air manifold includes a top guide plate 720 and a bottom guide plate 722. The guide plates direct partially cleaned air flowing from the tank first cyclone part 650 and through the perforated tube 690 towards the second cyclone part 652. The top guide plate 720 can be provided under the cover unit 624 and includes a wall 724. The cover unit can be hinged to provide access to the second cyclone part for cleaning. Located on the wall 724 is a plurality of downwardly projecting discharge guide tubes 726 for directing the cleaned air exhausted from the second cyclone part 652 into the cover unit 624. Each discharge guide tube can include a laminar flow member, such as a generally cross-shaped baffle 678, to stop the air from circulating within the discharge tube. The bottom guide plate 722 is spaced from the top guide plate 720 by a generally continuous, peripheral barrier 730 extending upwardly from a wall 732. The barrier abuts against a bottom surface of wall 724 to define an air passage from the manifold air inlet section 710 to the second cyclone part 652.

In the depicted embodiment, each downstream separator 672, which projects downwardly from the bottom guide plate 722, includes a dirty air inlet 740 in fluid communication with one of a plurality of isolated air conduits 742 defined by air manifold. Each manifold air conduit 742 directs a volume of partially cleaned air generally tangentially into the inlet 686 of each second stage separator. This causes a vortex-type, cyclonic or swirling flow. Such vortex flow is directed downwardly in the downstream separator since a top end thereof is blocked by the top guide plate 720.

The downstream separators 672 can be arranged in parallel and can be mounted on the air manifold 622 radially outside of the first cyclone part 650. Each downstream separator includes a dust blocking member 750 for limiting turbulence in the second dust collection chamber 644 and preventing re-entrapment of dirt that has fallen into the second dust collection chamber into the cleaned air exiting each downstream separator.

Pivotally secured to a lower portion of the first collection chamber 642 is a first bottom plate or lid 760. Pivotally secured to a lower portion of the second collection chamber 644 is a second bottom plate or lid 762. Each bottom lid can be separately opened which allows for independent emptying of its respective dust collection chamber. The first and second bottom lids can be opened at the same time for simultaneous emptying of the dust collection chambers. A single compound hinge assembly or separate hinge assemblies (not visible) can be used to mount the bottom lids to a bottom portion of the dirt cup 640.

The first collection chamber 642 is located beneath the first stage separator 670 and communicates with the first stage separator for collecting dust particles from the first stage separator. The first collection chamber can have a generally constant radius and includes a sidewall 766. The separate second collection chamber 644 collector communicates with the downstream separators 672 for collecting dust particles from the downstream separators. A section of the first separator sidewall 680 and a section of the first collection chamber sidewall 766 together at least partially define the second collection chamber 644. The second collection chamber can have a non-constant radius.

As discussed previously with respect to the operation of the first embodiment, the first cyclone part 650 separates dust from dust-laden air and the second cyclone part 652 separates remaining dust particles from the air. As such, the first collection chamber 642 requires emptying more frequently than the second collection chamber 644. The dirt-laden air is exhausted from the second cyclone part into the cover unit 624 before being discharged through a filter assembly 770 to an inlet of the electric motor and fan assembly 604.

Similar to the previous embodiment, and as shown in FIGS. 19 and 20, the filter assembly 770 includes a top plenum 772 releasably secured to a bottom plenum 774. The top plenum collects a flow of cleaned air from the downstream separators and directs the cleaned air through a filter element 776 for filtering any remaining fine dust remaining in the airflow exiting the downstream separators. The bottom plenum 774 collects a flow of cleaned air from the filter element and merges the flow of cleaned air into an inlet of the electric motor and fan assembly. In this embodiment, a two stage filter element 776, such as a compound member having a coarse foam layer 778 and a fine foam layer 790, is disclosed. Alternately, or in addition, a pleated filter can be employed.

A motor and fan assembly airflow exhaust outlet is in fluid communication with an exhaust assembly 800. The exhaust assembly includes an exhaust duct 802 and an exhaust grill 804 covering an outlet 806 of the exhaust duct. The exhaust duct can have an increasing cross-sectional area to reduce the velocity of the exhaust airflow. A pleated filter 808, such as a HEPA filter, is provided for filtering the exhaust air stream of any contaminants which may have been picked up in the motor assembly immediately prior to its discharge into the atmosphere.

As to a further discussion of the manner of usage and operation of each canister vacuum cleaner 500, 600, the same should be apparent from the above description relative to the first embodiment. Accordingly, no further discussion relating to the manner of usage and operation will be provided.

The present disclosure has been described with reference to several embodiments. Obviously, modifications and alterations will occur to others upon reading and understanding the preceding detailed description. It is intended that the illustrated embodiments be construed as including all such modifications and alterations, insofar as they come within the scope of the appended claims or the equivalents thereof.

What is claimed is:

1. A home cleaning appliance comprising:
   a housing comprising a main suction opening;
   an airstream suction source mounted to said housing and including a suction airstream inlet and a suction airstream outlet, said suction source selectively establishing and maintaining a flow of air from said main suction opening, via said airstream inlet, to said airstream outlet;
   a cyclone main body supported by said housing and in communication with said main suction opening, said cyclone main body being cylindrical and having a uniform outer circumference, said cyclone main body including:
      a first stage separator, and
      a plurality of downstream second stage separators,
      wherein said first stage separator has a longitudinal axis offset from a longitudinal axis of said cyclone main body in order to accommodate said second stage separators within said cyclone main body between a wall of the first stage separator and the outer circumference of the cyclone main body; and
   a dirt cup connected to said cyclone main body, said dirt cup including:
      a first particle collector communicating with said first stage separator for collecting dust particles from said first stage separator, and
      a separate second particle collector communicating with said plurality of second stage separators for collecting dust particles from said second stage separators;
   wherein said outer circumference of said cyclone main body has a constant radius, and wherein the wall of said first stage separator and a wall of said cyclone main body together at least partially define said separate second particle collector.

2. The home cleaning appliance of claim 1, further comprising an air manifold supported by said cyclone main body for fluidly connecting said first stage separator to said plurality of second stage separators, said air manifold including an upper guide plate and a lower guide plate, said upper and lower guide plates together defining a plurality of isolated air conduits, each air conduit directing a volume of partially cleaned air generally tangentially into an inlet of each second stage separator.

3. The home cleaning appliance of claim 1, further comprising a perforated tube disposed within said first stage separator for fluidly connecting said first stage separator to said plurality of second stage separators, said perforated tube including a longitudinal axis generally coincident with the longitudinal axis of said first stage separator and offset from the longitudinal axis of said cyclone main body.

4. The home cleaning appliance of claim 3, further comprising:
   a shroud supported by said perforated tube, and
   a laminar flow member connected to one of said perforated tube and said shroud, at least a portion of said laminar flow member being encircled by the shroud,
   wherein said shroud includes a first portion having a first dimension and a second portion having a second greater dimension, the configuration of said shroud positioning said laminar flow member centrally within said first particle collector.

5. The home cleaning appliance of claim 1, wherein said first particle collector includes an inner wall portion which at least partially defines said second particle collector, said inner wall portion being generally curved toward said second particle collector such that said first particle collector has a non-constant radius, wherein said dirt cup has a generally constant radius.

6. The home cleaning appliance of claim 1, wherein said first and second particle collectors are configured to empty independently of each other.

7. The home cleaning appliance of claim 1, wherein said first and second particle collectors are configured to be simultaneously emptied.

8. The home cleaning appliance of claim 1, wherein said plurality of second stage separators are arranged in parallel and mounted radially outside of said first stage separator, an uppermost end of each second stage separator being located approximately in a plane defined by a top wall of said first stage separator.

9. The home cleaning appliance of claim 1, wherein said plurality of downstream separators is surrounded by said wall of said cyclone main body.

10. The home cleaning appliance of claim 1, wherein said cyclone main body wall includes a sidewall opening which allows for removal of the dirt particles collected in said second particle collector.

11. The home cleaning appliance of claim 1, wherein each second stage separator is generally frusto-conical in shape, wherein a diameter of an upper end of one of said second stage separators is different from a diameter of an upper end of an adjacent one of said second stage separators.

12. The home cleaning appliance of claim 1, further comprising a dust blocking member connected to at least one second stage separator, wherein a lower end of said at least one second stage separator and a bottom surface of said dust blocking member are generally inclined at an acute angle relative to a longitudinal axis of said at least one second stage separator to allow dirt to easily pass downwardly through said at least one second stage separator and into said second particle collector.

13. A home cleaning appliance comprising:
a housing comprising a main suction opening;
an airstream suction source mounted to said housing and including a suction airstream inlet and a suction airstream outlet, said suction source selectively establishing and maintaining a flow of air from said main suction opening, via said airstream inlet, to said airstream outlet;
a cylindrical cyclone main body mounted to said housing and in communication with said main suction opening, said cylindrical cyclone main body including:
a first stage separator, and
a plurality of second stage separators arranged in parallel downstream of the first stage separator, wherein a diameter of an upper end of one of said second stage separators is larger than a diameter of an upper end of another one of said second stage separators;
wherein said first stage separator has a longitudinal axis offset from a longitudinal axis of said cylindrical cyclone main body to define a space within said cylindrical cyclone main body for housing said second stage separators; and
a dirt cup connected to said cylindrical cyclone main body for collecting separated dust particles.

14. The home cleaning appliance of claim 13, wherein a longitudinal axis of said dirt cup is offset from the longitudinal axis of said first stage separator, and further comprising a laminar flow member centrally positioned within said dirt cup.

15. The home cleaning appliance of claim 13, wherein said dirt cup includes:
a first particle collector communicating with said first stage separator for collecting a first portion of dust particles, and
a separate second particle collector communicating with said plurality of second stage separators for collecting a second portion of dust particles, wherein a wall of said first stage separator and a wall of said cylindrical cyclone main body together at least partially define said second particle collector.

16. A home cleaning appliance comprising:
a housing comprising a main suction opening;
an airstream suction source mounted to said housing and including a suction airstream inlet and a suction airstream outlet, said suction source selectively establishing and maintaining a flow of air from said main suction opening, via said airstream inlet, to said airstream outlet;
a cyclone main body supported by said housing and in communication with said main suction opening, said cyclone main body having a longitudinal axis, said cyclone main body including:
a first cyclonic separation stage having a longitudinal axis offset from the longitudinal axis of said cyclone main body, and
a second cyclonic separation stage spaced from said first cyclonic separation stage;
a dirt cup for collecting separated dust particles from said first and said second cyclonic separator stages, said dirt cup connected to said cyclone main body, said dirt cup having a longitudinal axis offset from the longitudinal axis of said first cyclonic separation stage;
a perforated tube disposed within said first cyclonic separation stage for fluidly connecting said first cyclonic separation stage to said second cyclonic separation stage, said perforated tube having a longitudinal axis coincident with the longitudinal axis of said first cyclonic separation stage; and
a laminar flow member connected to said perforated tube, said laminar flow member being centrally positioned within said dirt cup.

17. The home cleaning appliance of claim 16, wherein said second cyclonic separation stage comprises a plurality of second stage separators, each second stage separator being generally frusto-conical in shape, wherein a diameter of an upper end of one of said second stage separators is different from a diameter of an upper end of another one of said second stage separators.

18. A home cleaning appliance comprising:
a housing comprising a main suction opening;
an airstream suction source mounted to said housing and including a suction airstream inlet and a suction airstream outlet, said suction source selectively establishing and maintaining a flow of air from said main suction opening, via said airstream inlet, to said airstream outlet;
a cyclone main body supported by said housing and in communication with said main suction opening, said cyclone main body including:
an upstream, first cyclonic separator for separating dust from dust-laden air, said first separator being generally frusto-conical in shape and including a dirty air inlet, a top wall and a sidewall, and
at least one downstream, second cyclonic separator for separating remaining dust particles from the air; and
a dirt cup connected to said cyclone main body, said dirt cup including:
a first particle collector located beneath said first separator and communicating with said first separator for collecting dust particles separated by said first separator, said first particle collector including a sidewall, and
a second particle collector communicating with said at least one second separator for collecting dust particles separated by said at least one second separator, wherein a section of said first separator sidewall and a section of said first particle collector sidewall together at least partially define said second particle collector, wherein said second particle collector has a non-constant radius such that said second particle collector is generally crescent shaped.

19. The home cleaning appliance of claim 18, wherein said first separator sidewall has an outer surface and an inner surface, wherein said outer surface of said sidewall forms at least a part of an external surface of said housing.

* * * * *